United States Patent
Mitchelmore et al.

(10) Patent No.: US 11,198,095 B2
(45) Date of Patent: Dec. 14, 2021

(54) SILICA PRODUCTS FROM GEOTHERMAL FLUIDS BY REVERSE OSMOSIS

(71) Applicant: GEO40 LIMITED, Taupo (NZ)

(72) Inventors: Andrew W. Mitchelmore, Taupo (NZ);
Richard A. Simonis, Taupo (NZ);
Michael T. O'Sullivan, Taupo (NZ)

(73) Assignee: Geo40 Limited, Taupo (NZ)

( * ) Notice: Subject to any disclaimer, the term of this patent is extended or adjusted under 35 U.S.C. 154(b) by 103 days.

(21) Appl. No.: 15/313,849

(22) PCT Filed: May 22, 2015

(86) PCT No.: PCT/NZ2015/050064
§ 371 (c)(1),
(2) Date: Nov. 23, 2016

(87) PCT Pub. No.: WO2015/178783
PCT Pub. Date: Nov. 26, 2015

(65) Prior Publication Data
US 2017/0182460 A1    Jun. 29, 2017

(30) Foreign Application Priority Data
May 23, 2014  (NZ) ..................... 625448

(51) Int. Cl.
*B01D 61/02* (2006.01)
*B01D 61/04* (2006.01)
(Continued)

(52) U.S. Cl.
CPC ........... *B01D 61/025* (2013.01); *B01D 61/04* (2013.01); *B01D 61/145* (2013.01); *C01B 33/12* (2013.01);
(Continued)

(58) Field of Classification Search
USPC ............... 210/639, 641, 642, 767, 806, 259, 210/321.72, 321.75, 321.84, 500.21
See application file for complete search history.

(56) References Cited

U.S. PATENT DOCUMENTS 3,969,266 A    7/1976  Iler
4,161,446 A *  7/1979  Coillet .............. B01D 61/025
                                                210/638

(Continued)

FOREIGN PATENT DOCUMENTS

CN    104692554    6/2015
EP    0396242      11/1990

(Continued)

OTHER PUBLICATIONS

Guerra E. Carlos et al (2012) "pH Modifications for Silica Control in Geothermal Fluids", pp. 1-9, XP055418083, Retrieved from the Internet: URL:http://www.os.is/ gogn/unu-gtp-sc/UNU-GTP-SC-14-39.pdf.

(Continued)

*Primary Examiner* — Joseph W Drodge
(74) *Attorney, Agent, or Firm* — FisherBroyles, LLP; Cara L. Crowley-Weber

(57) ABSTRACT

The invention concerns a method and apparatus for producing silica concentrates from geothermal fluids containing at least 300 ppm silica, by passing the fluid at a temperature above 80° C. and at a pH reduced to between 4.0 and 7.5 through a reverse osmosis membrane. In the diagram, geothermal fluid (1) is passed to a separator (2) to be flashed to produce steam (3) and separated geothermal water (SGW) (4). The SGW (4) is passed to a heat exchanger (5) then inlet pump (7). Acid is introduced to the geothermal fluid flow at a dosing means (6) to reduce the pH and an anti-sealant may also be introduced. The geothermal fluid is then passed to a reverse osmosis unit (8) to produce a concentrate (9) and a (Continued)

permeate (10). Following reverse osmosis, the concentrate and permeate may be treated with other processes to produce the desired product and concentration. For example, if precipitated silica is produced, the concentrate is passed to a curing tank (11) and to a thickener (12). The precipitated silica is collected (13) while the retained fluid is removed (14).

15 Claims, 8 Drawing Sheets

(51) Int. Cl.
| | | |
|---|---|---|
| C02F 1/44 | (2006.01) | |
| C02F 1/66 | (2006.01) | |
| C01B 33/12 | (2006.01) | |
| B01D 61/14 | (2006.01) | |
| C01B 33/14 | (2006.01) | |
| C02F 101/10 | (2006.01) | |
| C02F 103/06 | (2006.01) | |

(52) U.S. Cl.
CPC ............ *C01B 33/126* (2013.01); *C01B 33/14* (2013.01); *C02F 1/441* (2013.01); *C02F 1/444* (2013.01); *C02F 1/66* (2013.01); *B01D 2311/04* (2013.01); *B01D 2311/18* (2013.01); *C02F 2101/10* (2013.01); *C02F 2103/06* (2013.01)

(56) References Cited

U.S. PATENT DOCUMENTS

| | | | |
|---|---|---|---|
| 4,437,995 A | | 3/1984 | Rex |
| 5,200,165 A * | | 4/1993 | Harper .................. B82Y 30/00 |
| | | | 423/335 |
| 5,595,717 A * | | 1/1997 | Harper .................. C01B 33/12 |
| | | | 423/339 |
| 6,372,089 B1 | | 4/2002 | Keiser et al. |
| 6,372,806 B1 | | 4/2002 | Keiser et al. |
| 6,537,457 B1 | | 3/2003 | Mukhopadhyay |
| 7,501,065 B1 * | | 3/2009 | Bader .................. B01D 61/027 |
| | | | 210/652 |
| 10,190,030 B2 * | | 1/2019 | Harrison .................. B01J 20/08 |
| 10,626,018 B2 * | | 4/2020 | Mitchelmore ......... B01D 63/06 |
| 10,717,655 B2 * | | 7/2020 | Mitchelmore ......... B01D 63/10 |
| 2004/0079700 A1 * | | 4/2004 | Wood ....................... A61K 9/08 |
| | | | 210/636 |
| 2005/0061149 A1 | | 3/2005 | Nieuwenhuizen et al. |
| 2006/0151394 A1 * | | 7/2006 | Duke .................... C23F 11/182 |
| | | | 210/652 |
| 2008/0290033 A1 | | 11/2008 | Kimball et al. |
| 2009/0008334 A1 | | 1/2009 | Schoen et al. |
| 2009/0081105 A1 * | | 3/2009 | Bourcier .................. C01B 33/12 |
| | | | 423/339 |
| 2009/0173692 A1 | | 7/2009 | Laraway et al. |
| 2010/0032375 A1 | | 2/2010 | Jagannathan et al. |
| 2010/0294719 A1 * | | 11/2010 | Polizzotti .................. C02F 9/00 |
| | | | 210/654 |
| 2011/0163031 A1 * | | 7/2011 | Kimball ............... B01D 61/022 |
| | | | 210/638 |
| 2011/1016303 | | 7/2011 | Kimball et al. |
| 2012/0055875 A1 * | | 3/2012 | Lien ....................... B01D 61/58 |
| | | | 210/638 |
| 2012/0267307 A1 * | | 10/2012 | McGinnis ............... C02F 1/441 |
| | | | 210/638 |
| 2013/0126174 A1 | | 3/2013 | Henson et al. |
| 2014/0054233 A1 * | | 2/2014 | Harrison .................. C02F 9/00 |
| | | | 210/714 |
| 2014/0286847 A1 | | 9/2014 | Bourcier |
| 2015/0158748 A1 * | | 6/2015 | Karlapudi ................ C02F 1/52 |
| | | | 210/639 |
| 2016/0002073 A1 * | | 1/2016 | Nowosielski-Slepowron ............. |
| | | | C02F 1/445 |
| | | | 210/644 |
| 2017/0182460 A1 | | 6/2017 | Mitchelmore |

FOREIGN PATENT DOCUMENTS

| | | |
|---|---|---|
| JP | S57-21981 A | 2/1982 |
| JP | 58190816 | 11/1983 |
| JP | 11-662 | 1/1999 |
| JP | 2005-522311 | 7/2005 |
| WO | 1997-041954 | 11/1997 |
| WO | 2002026362 A1 | 4/2002 |
| WO | 2003-084645 | 10/2006 |
| WO | 2009079047 A2 | 6/2009 |
| WO | 2015-178783 | 5/2015 |

OTHER PUBLICATIONS

Barbara Tomaszewska et al (2012) "Desalination of geothermal waters using a hybrid UF-RO process. Part I: Boron removal in pilot-scale tests", Desalination, vol. 319:99-106, XP055150932.
Barbara Tomaszewska et al (2013) "Desalination of geothermal waters using a hybrid UF-RO process. Part II: Membrane scaling after pilot-scale tests", Desalination, vol. 319:107-114, XP055417909.
Extended European Search Report, European Application No. EP 15795667.3, dated Nov. 7, 2017.
Sears (1956) "Determination of Specific Surface Area of Colloidal Silica by Itration with Sodium Hydroxide" Analytical Chemistry 28(12):1981-1983.
Stöber et al. (1968) "Controlled Growth of Monodisperse Silica Spheres in the Micron Size Range" J. Colloid and Interface Science 26:62-69.
Brown and Bacon (2000) Proceedings World Geothermal Congress "Manufacture of Silica Sols From Separated Geothermal Water".
EP Supplementary Search Report from EP App No. 16812024 dated Jan. 29, 2019.
European Extended Search Report from EP Application No. 16755972.3 dated Sep. 18, 2018.
International Preliminary Examination Report on Patentability from PCT/NZ2016/050026 dated Jul. 4, 2017.
International Search Report and Written Opinion from PCT/NZ2016/050099 dated Sep. 2, 2016.
Gallup (2011) "Brine pH Modification Scale Control Technology. 2. A Review" GRC Transactions 35:609-614.
Mroczek et al. (2010) "pH Modification Pilot Plant Trials" Proceedings World Geothermal Congress Bali Indonesia 25-29.
Harper et al. (1992) "Towards the efficient utilization of geothermal resources," Geothermics, 21, No. 5/6, pp. 641-651.
R.K. Iler (1979) "Chemistry of Silica," Chapter 1, John Wiley & Sons, New York.
Ning (2002) "Desalination" 151, pp. 67-73.
International Preliminary Report on Patentability (Chaper II of the PCT), PCT/NZ2015/050064, dated Sep. 13, 2016.

\* cited by examiner

SILICA PRODUCTS FROM GEOTHERMAL FLUIDS BY REVERSE OSMOSIS

This application is a National Stage Application of PCT/NZ2015/050064 filed May 22, 2015, which claims benefit of NZ 625448, filed May 23, 2014, both of which are incorporated herein by reference. To the extent appropriate, a claim of priority is made to each of the above disclosed applications.

FIELD OF INVENTION

The invention relates to methods of concentration of silica in high temperature geothermal fluids. More particularly, the invention relates to the concentration of silica in geothermal fluids by using reverse osmosis.

BACKGROUND

Geothermally heated fluid has historically been used for direct heating but has more recently been harnessed to produce electricity. Electricity generated through geothermal power stations has been shown to be reliable, sustainable and environmentally friendly. Since geothermal power requires no fuel (except for running pumps in some power stations) it is insulated from fossil fuel cost fluctuations and dependencies. Geothermal power production also has significantly lower emissions of greenhouse gases when compared to fossil fuel electricity production methods and therefore has the potential to help mitigate global warming if widely deployed in place of fossil fuels.

One major advantage over other renewable energy sources such as wind or solar is that geothermal power does not suffer from the intermittent supply inherent in these methods. As a result, it also reduces the need for energy storage capabilities. Despite the traditional limitations of geothermal power plants requiring near-surface geothermal activity, recent advances in technology have dramatically expanded the scope of areas which can support geothermal power production.

Geothermal electricity is mainly produced via two methods. The first method produced from flash steam power plants is generally employed in areas with high temperature geothermal fluids and involves "flashing" the geothermal fluid. This involves passing the high-pressure fluid into lower-pressure tanks to result in the separation of the fluid into steam and separated geothermal water (SGW). The resulting steam is used to drive turbines while the SGW is either re-injected into the ground or passed into a single stage binary cycle plant where further electricity is extracted from the SGW. The second method of electricity generation is through use of two stage binary cycle power station. These plants involve the separating of steam and SGW in a flash plant with both the geothermal fluid and the steam being passed through different heat exchangers and used to vaporise a low boiling point secondary fluid (typically pentane) which in turn drives a turbine for electricity production. Again, the cooled geothermal fluid is typically re-injected or passed into above-ground watercourses. Binary cycle power stations are able to operate with much cooler initial geothermal fluid temperatures.

Geothermal fluids contain a number of ionic species and particulate matter originating from rocks in the earth's crust. When energy is extracted from the geothermal source stream, the reduction in temperature causes a decrease in solubility of a number of dissolved species which can lead to their precipitation. This process of precipitation can be beneficial when used to extract the dissolved species. However, if too much heat is extracted, the dissolved species will precipitate out of solution leading to scaling and fouling of pipes watercourses and other equipment. In addition, where geothermal fluids are re-injected into the ground, precipitation of species around the re-injection site can result in underground blockages and reduction in flow. Geothermal sources differ in the concentrations of dissolved species depending on geological composition. However, the precipitation problem is a major limitation preventing effective utilisation and energy recovery from geothermal sources. Enabling further energy recovery from existing geothermal sources would have major economic benefits and assist in the movement away from fossil fuel power.

A significant component of the geothermal fluid is silica (silicon dioxide). Extraction of silica is desirable to avoid the precipitation problems described above during energy recovery. One study estimates that 25% more power could be generated from exploitable geothermal resources if silica could be successfully extracted (Harper et al. 1992). In addition, precipitated silica and colloidal silica are valuable commodities in their own right with a range of industrial applications.

Prior to precipitation, silica particles form by spontaneous nucleation of the parent monomeric silicic acid species. These monomers subsequently grow by polymerization to form polymeric primary silica particles which attain a physical dimension of about 1.5 nm (Harper, 1997—U.S. Pat. No. 5,595,717A). These particles can either grow by acquiring more monomers to form a colloid, or the particles can aggregate leading to formation of a gelatinous substance known as silica gel. Silica colloids are simply large silica polymers that naturally take on a spherical shape due to surface forces. A ten nanometre colloid contains approximately 15,000 silica molecules. Depending on the conditions and presence of certain coagulants, silica particles may precipitate out of solution as a solid to form a suspension.

Despite the longstanding recognition of the problem of silica precipitation from geothermal waters, commercially viable solutions to deal with the problem by extraction of silica are yet to emerge. Known methods have focused on extraction of silica from low temperature sources (i.e. <75° C.) with low silica concentrations (i.e. <275 ppm). Extraction has been carried out on sources that have already undergone energy extraction.

It is an object of the invention to provide a method of producing a silica concentrate from a geothermal fluid, or at least to provide the public with a useful choice.

SUMMARY OF THE INVENTION

According to a first aspect of the invention, there is provided a method of producing a silica concentrate from a geothermal fluid containing silica, the method comprising:
  a. reducing the pH of the geothermal fluid to between about 4.0 and 7.5 prior to passing the geothermal fluid to a reverse osmosis unit; and
  b. passing the geothermal fluid of a, at a temperature of at least 85° C. through a system comprising the reverse osmosis unit to produce a silica concentrate and a permeate;

wherein the silica concentration in the geothermal fluid is at least 300 ppm.

Preferably the pH is reduced by addition of at least one acid to the geothermal fluid. Preferably the acid is one or more of hydrochloric acid, sulphuric acid, nitric acid, citric acid, phosphoric acid or an anti-scalant which reduces pH.

Preferably the pH of the geothermal fluid is reduced to less than pH 7.5, less than pH 6.5, less than pH 6.0, less than pH 5.5, less than pH 5.0, or less than pH 4.5. Preferably the pH is reduced to greater than pH 4.0, greater than pH 4.5, greater than pH 5.0, greater than pH 5.5, greater than pH 6.0, greater than pH 6.5, or greater than pH 7.0. In a particular embodiment, the pH is approximately 4.5, 5.0, 5.5, 6.0, 6.5, 7.0, or 7.5.

Preferably, the geothermal fluid is passed to the reverse osmosis unit at a temperature of between about 85° C. and about 200° C., more preferably between about 100° C. and about 140° C.

Preferably, the geothermal fluid is passed to the reverse osmosis unit at a temperature of at least 85° C., at least 90° C., at least 100° C., at least 110° C., at least 120° C., at least 130° C., at least 140° C., at least 150° C., at least 160° C., at least 170° C., at least 180° C. or at least 190° C.

Preferably the temperature of the fluid passed to the reverse osmosis unit is less than 200° C., less than 190° C., less than 180° C., less than 170° C., less than 160° C., less than 150° C., less than 140° C., less than 130° C., less than 120° C., less than 110° C., less than 100° C., or less than 90° C. Preferably the temperature of the geothermal fluid is approximately 80° C., 90° C., 100° C., 110° C., 120° C., 130° C., 140° C., 150° C., 160° C., 170° C., 180° C., 190° C. or 200° C.

Preferably the method includes a further step to improve flow of the geothermal fluid flow through the reverse osmosis unit to produce a concentrate.

Preferably the step to improve flow comprises the addition of one or more of an anti-scalant and a dispersant to the geothermal fluid prior to passing the geothermal fluid to the reverse osmosis unit.

Preferably the dispersant is Nalco Geo 980.

Preferably the anti-scalant is at least one of Nalco Geo 980, Nalco Geo 905 or Nalco PC-510T.

Preferably the geothermal fluid is separated geothermal water (SGW) or unseparated geothermal water.

Preferably, the recovery rate of the reverse osmosis step is between 30% and 70%. Preferably the recovery rate is less than 70%, less than 65%, less than 60%, less than 55%, less than 50%, or less than 45%. Preferably the recovery rate of the reverse osmosis is greater than 40%, greater than 45%, greater than 50%, greater than 55%, greater than 60%, or greater than 65%. Preferably the recovery rate of the reverse osmosis is approximately 40%, 45%, 50%, 55%, 60%, 65% or approximately 70%.

Preferably the feed pressure of the geothermal fluid is substantially constant relative to the recovery rate of the reverse osmosis step during substantially continuous operation of the process. Preferably, the feed pressure of the geothermal fluid increases by less than 5%, less than 4%, less than 3%, less than 2%, less than 1%, less than 0.5% or less than 0.1% relative to the recovery rate of the reverse osmosis step over a representative period of one hour substantially continuous operation of the process.

Preferably, the concentration of silica in the geothermal fluid is at least 300 ppm. More preferably, the concentration of silica in the geothermal fluid is at least 400 ppm, at least 500 ppm, or at least 600 ppm. Preferably, the concentration of silica in the silica concentrate is at least 600 ppm, at least 700 ppm, at least 800 ppm, at least 900 ppm, at least 1000 ppm, at least 1100 ppm, at least 1200 ppm, at least 1300 ppm, at least 1400 ppm, at least 1500 ppm, at least 1600 ppm, at least 1700 ppm, at least 1800 ppm, at least 1900 ppm, at least 2000 ppm, at least 2100 ppm, at least 2200 ppm, at least 2200 ppm, at least 2300 ppm, at least 2400 ppm, at least 2500 ppm, at least 2600 ppm, at least 2700 ppm, at least 2800 ppm, at least 2900 ppm, at least 3000 ppm, at least 4000 ppm or at least 5000 ppm.

Preferably, the method includes a step of pre-heating the system comprising the reverse osmosis unit to a temperature of between about 70° C. and about 200° C. prior to passing the geothermal fluid through the system.

Preferably, the method includes a step of maintaining the system comprising the reverse osmosis unit at a temperature of between about 70° C. and about 200° C. while the geothermal fluid passes through the unit. Preferably, the system comprising the reverse osmosis unit is preheated to or maintained at a temperature substantially equal to the temperature of the fluid passed to the reverse osmosis unit. Preferably, this temperature is at least 70° C., at least 80° C., at least 90° C., at least 100° C., at least 110° C., at least 120° C., at least 130° C., at least 140° C., at least 150° C., at least 160° C., at least 170° C., at least 180° C. or at least 190° C. Preferably the system comprising the reverse osmosis unit is preheated to or maintained at less than 200° C., less than 190° C., less than 180° C., less than 170° C., less than 160° C., less than 150° C., less than 140° C., less than 130° C., less than 120° C., less than 110° C., less than 100° C., less than 90° C., or less than 80° C. Preferably the system comprising the reverse osmosis unit is pre-heated to and or maintained at approximately 70° C., 80° C., 90° C., 100° C., 110° C., 120° C., 130° C., 140° C., 150° C., 160° C., 170° C., 180° C., 190° C. or 200° C.

Preferably, the system comprising the reverse osmosis unit is pre-heated by a pre-heating stream heated by geothermal fluid at a temperature sufficient to transfer heat to the pre-heating stream.

Preferably, the pre-heating stream is received from a heat exchanger, wherein the heat exchanger receives geothermal fluid which heats the pre-heating stream.

Preferably, the pre-heating stream comprises permeate previously collected from the reverse osmosis unit. Preferably, the pre-heating stream is received at a heat exchanger from a permeate collection tank containing permeate previously collected from the reverse osmosis unit. The pre-heating step may be carried out before any reverse osmosis steps defined herein.

Preferably, the silica concentrate is further processed to produce at least one of precipitated silica and colloidal silica.

Preferably, the further processing comprises one or more of the following steps:
 a. passing the silica concentrate to a curing tank to produce a cured silica concentrate;
 b. removing colloidal silica through the use of an ultrafiltration unit
 c. addition of a precipitant to the silica concentrate
 d. stirring the silica concentrate
 e. passing the cured silica concentrate solution to a thickener
 f. addition of a flocculant
 g. passing the silica concentrate and/or a supernatant produced by the second or further RO unit to increase silica concentration or recovery
 h. passing the silica concentrate of the second or further RO unit to a curing tank
 i. washing the cured silica concentrate with hot water
 j. washing the cured silica concentrate with acid
 k. drying the silica concentrate to yield precipitated silica powder.
 l. further concentrating the silica in the silica concentrate by ultrafiltration.

Preferably the precipitant is NaCl, CaCl, FeCl$_3$, Polyaluminum chloride or PLC.

Preferably, the further processing produces precipitated silica and the further processing comprises at least one of the following steps:
a. passing the silica concentrate to a curing tank to produce a cured silica concentrate;
b. increasing the concentration of the silica concentrate through the use of a UF unit
c. addition of a precipitant to the silica concentrate to precipitate the silica
d. stirring the silica concentrate
e. further concentrating the silica in the silica concentrate by ultrafiltration.
f. passing the cured silica concentrate solution or the precipitated silica solution to a thickener
g. addition of a flocculant
h. passing the silica concentrate of the second or further RO unit to a curing tank
i. passing the silica concentrate from the UF unit to the curing tank to increase silica recovery
j. washing the precipitated silica concentrate with hot or cold water (diafiltration)
k. washing the cured silica concentrate with hot water to dissolve salts (e.g. halide compounds)
l. washing the precipitated silica concentrate with acid
m. drying the silica concentrate to yield precipitated silica powder.

Preferably, the further processing produces colloidal silica and the further processing comprises at least one of the following steps:
a. passing the silica concentrate to a curing tank to produce a cured silica concentrate;
b. concentrating colloidal silica through the use of an ultrafiltration unit
c. diafiltrating the UF concentrate with RO permeate to reduce salt concentration
d. passing the silica concentrate produced from the UP unit through a second or further RO unit to increase silica recovery
e. further concentrating the silica in the silica concentrate by ultrafiltration.

Preferably, the further processing comprises further concentrating the silica in the silica concentrate by ultrafiltration (UF). Preferably, the silica concentrate is treated by a UF pre-treatment to increase the rate of silica particle polymerization. Preferably, the UF pre-treatment comprises increasing the pH of the silica concentrate prior ultrafiltration. Preferably, the pH is increased by adding sodium hydroxide to the silica concentrate. Preferably, the pH is increased to between 7.0 and 10.0, or to at least 7.0, at least 7.5, at least 8.0, at least 8.5, at least 9.0, or at least 9.5. Preferably the pH is increased to approximately 7.0, 7.5, 8.0, 8.5, 9.0, 9.5 or 10.0.

Preferably, the UF pre-treatment process further comprises curing the silica concentrate to produce a cured silica concentrate. Preferably the curing occurs in one or more curing tanks. Preferably, the curing time is between 5 minutes and 2 hours. Preferably, the curing time is approximately 30 minutes. Preferably, the curing time is selected from the group consisting of greater than 5 minutes, greater than 10 minutes, greater than 15 minutes, greater than 30 minutes, greater than 1 hour, greater than 2 hours, less than 6 hours, less than 2 hours, less than 1 hour, less than 30 minutes, less than 15 minutes, between 10 minutes and 1 hour, between 10 minutes and 45 minutes, approximately 5 minutes, approximately 10 minutes, approximately 15 minutes, approximately 20 minutes, approximately 30 minutes, approximately 45 minutes, approximately 1 hour and approximately 2 hours.

Preferably, the silica concentrate or the cured silica concentrate is further concentrated by ultrafiltration in at least one ultrafiltration unit to yield a first UF retentate. Preferably, the silica concentration of the first UF retentate is selected from the group consisting of greater than 0.1 m %, greater than 0.5 m %, greater than 1 m %, greater than 1.5 m %, greater than 2 m %, greater than 5 m %, greater than 10 m %, greater than 15 m %, between 0.1 m % and 20 m %, approximately 0.5 m %, approximately 1 m %, approximately 1.5 m % and approximately 2 m %, approximately 3 m %, approximately 4 m %, approximately 5 m %, approximately 10 m %, approximately 15 m %, and approximately 20 m %.

Preferably the first UF retentate is further concentrated at a second or further UF unit to yield a second or further UF retentate. Preferably, the second or further UF unit produces a second or further UF retentate of at least 10 m %. Preferably, the second or further UF unit produces a UF retentate wherein the silica concentration is selected from the group consisting of greater than 2 m %, greater than 5 m %, greater than 10 m %, greater than 15 m %, greater than 20 m %, greater than 30 m %, greater than 40 m %, between 2 m % and 50 m %, approximately 10 m %, approximately 20 m %, approximately 30 m %, approximately 40 m % and approximately 50 m %.

Preferably, the first, second or further UF retentate comprises at least one of colloidal silica and precipitated silica. Preferably, the method includes a further step of addition of a precipitant to a colloidal silica concentrate to produce precipitated silica. Preferably the pH is raised prior to addition of the precipitant. Ultrafiltration to produce a first, second or further UF retentate may be used after any of the previously described processes comprising reverse osmosis, or variations thereof.

In a particular embodiment, the invention provides a method of producing a silica concentrate from a geothermal fluid containing at least 300 ppm silica, the method comprising:
a. reducing the pH of the geothermal fluid to between about 4.5 and 6.5 prior to passing the geothermal fluid to a reverse osmosis unit; and
b. passing the geothermal fluid of a, at a temperature of between 85° C. and 140° C. through a system comprising the reverse osmosis unit to produce a silica concentrate and a permeate;
c. increasing the pH of the silica concentrate to between 7.5 and 9.5;
d. curing the silica concentrate in one or more curing tanks;
e. passing the silica concentrate to at least one ultrafiltration unit for ultrafiltration to yield a first UF retentate comprising at least one of colloidal silica and precipitated silica.

In a second aspect, the invention provides a system for concentrating silica from a geothermal fluid, the system comprising:
a. a reverse osmosis unit adapted to receive the geothermal fluid at a temperature of at least 85° C. and produce a permeate and a silica concentrate.
b. a dosing means adapted to dose the geothermal fluid with a pH reducing substance prior to it being received at the reverse osmosis unit.

Preferably the pH reducing substance is presented in a sufficient amount to reduce the pH of the geothermal fluid to between pH 4.0 and 7.5. Preferably the dosing means is an acid dosing means. Preferably, the acid dosing means is an acid dosing pump.

Preferably the system further comprises a feed heat exchanger adapted to receive geothermal fluid and reduce the temperature of the geothermal fluid and pass the fluid to the RO unit. Preferably, the feed heat exchanger is further adapted to receive geothermal fluid and heat a pre-heating stream. Preferably, the feed heat exchanger comprises an outlet to pass the at least one of geothermal fluid and a pre-heating stream to the reverse osmosis unit.

Preferably, the feed heat exchanger is a plate heat exchanger, a pipe-type heat exchanger or a tube and shell heat exchanger. Preferably, the system further comprises a dosing means for dosing the geothermal fluid with one or more an anti-scalants prior to entering the reverse osmosis unit. Preferably, the system further comprises a curing tank capable of receiving at least a portion of a silica concentrate from the reverse osmosis unit.

Preferably, the system further comprises a thickener capable of receiving at least a portion of the silica concentrate.

Preferably, the system further comprises a permeate collection tank adapted to receive at least a portion of the permeate from the reverse osmosis unit. Preferably the permeate collection tank has an outlet to pass a pre-heating stream to the feed heat exchanger.

Preferably, the system further comprises a pressure control valve adapted to reduce or sustain the pressure of the geothermal fluid in the reverse osmosis unit.

Preferably, the system further comprises at least one ultrafiltration (UF) unit adapted to receive a silica concentrate produced by the reverse osmosis unit.

Preferably, the at least one UF unit is adapted to receive a silica concentrate stream from a curing tank which is adapted to receive the silica concentrate from the reverse osmosis unit.

In a third aspect, the invention provides at least one of a silica concentrate, precipitated silica or colloidal silica when obtained by a method as described in the first aspect of the invention.

Further aspects of the invention, which should be considered in all its novel aspects, will become apparent to those skilled in the art upon reading of the following description which provides at least one example of a practical application of the invention.

According to another aspect of the invention, there is provided a method of producing a silica concentrate from a geothermal fluid, the method comprising:
  a. reducing the pH of the geothermal fluid to between about 5.5 and 6.5; and
  b. passing the geothermal fluid at a temperature of between about 100° C. and 140° C. through a reverse osmosis unit to produce a silica concentrate and a permeate;
  wherein the recovery rate of the permeate is less than 65%, and
  wherein the silica concentration in the geothermal fluid is at least 300 ppm, and
  wherein a dispersant and an anti-scalant are added prior to the geothermal fluid passing to the reverse osmosis unit.

According to another aspect of the invention, there is provided a method of producing a silica concentrate from a geothermal fluid, the method comprising:
  a. reducing the pH of the geothermal fluid to between about 4.5 and 7.0;
  b. passing the geothermal fluid at a temperature of between about 85° C. and 150° C. through a reverse osmosis unit to produce a silica concentrate and a permeate;
  c. increasing the pH of the silica concentrate to between pH 7-10;
  d. curing the silica concentrate for a period to allow silica colloids to form; and
  e. concentrating the silica in the silica concentrate by ultrafiltration to produce a first UF retentate;
  wherein the silica concentration in the geothermal fluid is at least 300 ppm, and
  wherein an anti-scalant is added prior to the geothermal fluid passing to the reverse osmosis unit.

According to another aspect of the invention, there is provided a method of producing a silica concentrate from a geothermal fluid, the method comprising:
  a. reducing the pH of the geothermal fluid to between about 4.5 and 7.0;
  b. passing the geothermal fluid at a temperature of between about 85° C. and 150° C. through a reverse osmosis unit to produce a silica concentrate and a permeate;
  c. curing the silica concentrate for a period to allow silica colloids to form; and
  d. concentrating the silica in the silica concentrate by ultrafiltration to produce a first UF retentate;
  wherein the silica concentration in the geothermal fluid is at least 300 ppm, and
  wherein an anti-scalant is added prior to the geothermal fluid passing to the reverse osmosis unit.

According to another aspect of the invention, there is provided a method of producing a silica concentrate from a geothermal fluid, the method comprising:
  a. reducing the pH of the geothermal fluid to between about 4.5 and 7.0;
  b. passing the geothermal fluid at a temperature of between about 85° C. and 150° C. through a reverse osmosis unit to produce a silica concentrate and a permeate;
  c. increasing the pH of the silica concentrate to between pH 7-10;
  d. curing the silica concentrate for a period to allow silica colloids to form; and
  e. concentrating the silica in the silica concentrate by ultrafiltration to produce a first UF retentate;
  wherein the silica concentration in the geothermal fluid is at least 300 ppm, and
  wherein an anti-scalant is added prior to the geothermal fluid passing to the reverse osmosis unit, and
  wherein the silica concentration in the UF retentate is between 2-50 m %.

According to another aspect of the invention, there is provided a method of producing a silica concentrate from a geothermal fluid, the method comprising:
  a. reducing the pH of the geothermal fluid to between about 4.5 and 7.0;
  b. passing the geothermal fluid at a temperature of between about 85° C. and 150° C. through a reverse osmosis unit to produce a silica concentrate and a permeate;
  c. increasing the pH of the silica concentrate to between pH 7-10;
  d. curing the silica concentrate for a period to allow silica colloids to form; and
  e. concentrating the silica in the silica concentrate by ultrafiltration to produce a first UF retentate;

f. adding a precipitant to the first UF retentate to precipitate the silica;
wherein the silica concentration in the geothermal fluid is at least 300 ppm, and
wherein an anti-scalant is added prior to the geothermal fluid passing to the reverse osmosis unit, and
wherein the silica concentration in the UF retentate is between 2-50 m %.

According to another aspect of the invention, there is provided a method of producing a silica concentrate from a geothermal fluid, the method comprising:
a. reducing the pH of the geothermal fluid to between about 4.5 and 7.0;
b. passing the geothermal fluid at a temperature of between about 85° C. and 150° C. through a reverse osmosis unit to produce a silica concentrate and a permeate;
c. adding a precipitant to the silica concentrate to precipitate the silica;
wherein the silica concentration in the geothermal fluid is at least 300 ppm.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

Figure 1:
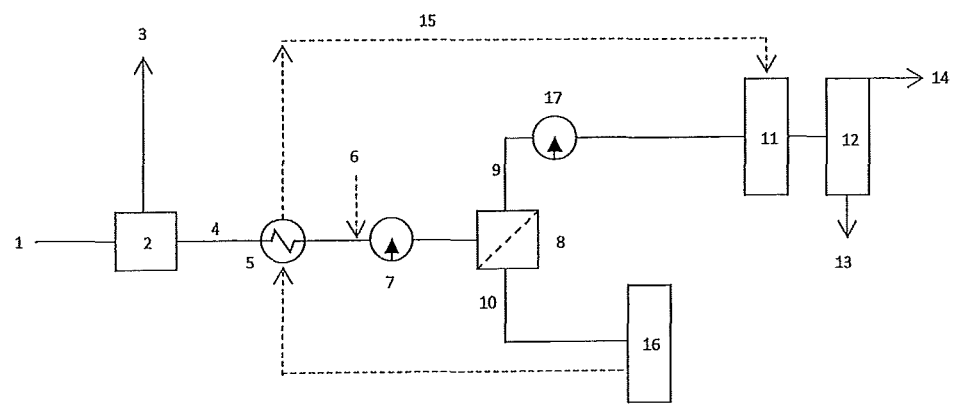
FIG. 1 shows an embodiment of the invention in which a geothermal fluid is received by a reverse osmosis unit, concentrated then processed to produce precipitated silica.

"Geothermal fluid" refers to any liquid fraction of a fluid stream principally obtained from the ground and heated by geothermal energy. The geothermal fluid may be separated geothermal water (SGW) which is produced following flashing of a high temperature pressurised geothermal stream to separate steam, or unseparated geothermal water.

A "colloid" refers to a non-crystalline substance consisting of large molecules or ultramicroscopic particles of one substance dispersed in a continuous phase through a second substance. "Colloidal silica" or "silica colloids" refers to a dispersed suspension of silicon dioxide (silica) particles in a liquid phase. Typically colloidal silica comprises large silica polymers that naturally take on a spherical shape due to surface forces.

"Precipitated silica" or a "silica precipitate" refers to solid silica which has precipitated out of a solution. This precipitated silica may be present as a suspension. Precipitated silica can be recognised as being different to colloidal silica because precipitated silica will eventually settle whereas colloidal silica will be retained in a dispersed phase.

"Silica concentration" and the like refer to the total silica concentration in a liquid phase.

Total silica (i.e. monomeric silica plus colloidal silica) may be measured by an ionic coupled plasma (ICP) test or an X-ray fluorescence (XRF) test. Monomeric concentration of silica may be measured using any known method however unless indicated otherwise, the values provided herein were measured using the molybdate method. This method generally involves a molybdate powder being added to the sample which turns yellow. The resulting liquid is then measured using a colour disc method. Kits to perform such measurements will be known to those skilled in the art, as an example, kits and colorimeters provided by Hach may be used. In the present invention the kit used was Hach Molybdate Test Unit Model MO-2. Unless stated otherwise, colloidal silica was measured using a hydrometer by calculation of its specific gravity and expressed in units of m %. Total silica is expressed in terms of parts per million (ppm) or mass percentage (m %).

"Metal" or "metal component" as referred to herein is not limited to a pure elemental form of the metal and is intended to encompass ionic forms of metals that may be in solution, in suspension, or in any other state. These terms are also intended to encompass metalloid elements.

"Concentrate" refers to the fraction of fluid exiting a reverse osmosis unit that has not passed through the semipermeable membrane of the unit. A silica concentrate is a concentrate comprising silica.

"Permeate" refers to the fraction of fluid exiting a reverse osmosis/ultrafiltration unit that has passed through the semipermeable membrane of the unit.

"Recovery rate" or "recovery" when referring to a reverse osmosis process means the percentage amount of feed that passes through the reverse osmosis membrane as permeate.

An "ultrafiltration unit" as referred to herein comprises an ultrafiltration housing containing one or more semi-permeable membranes. The unit may be any suitable unit and such units will be known to those of skill in the art. By way of example, the housing of the unit may comprise a Pentair Codeline model 80860. The membrane received within the housing may comprise any suitable membrane. In a particular embodiment, the membrane comprises a 4 inch spiral wound membrane. In alternative embodiments, the membrane may comprise an 8 inch spiral wound membrane or another size of spiral wound membrane. Those of skill in the art will appreciate membranes and housings appropriate for the process. However, by way of example, the membrane may be sourced from Membrane Development Specialists, San Diego, USA.

"UF retentate" is the portion of the fluid that enters the UF unit that does not pass through the semi-permeable membrane.

"Diafiltration" comprises the addition of a liquid with a lower concentration of ions or impurities to a feed of higher concentration to dilute the components of the feed. Diafiltration may be carried out according to known methods.

A "thickener" is an apparatus used to separate out the precipitated silica from the retained geothermal fluid. A "system comprising the reverse osmosis unit" comprises pipework and other features that would be typically employed to enable the transport and flow of geothermal fluids from a feed to the reverse osmosis unit and onward to any further processing apparatus (e.g. one or more ultrafiltration units). By way of example, the "system" may include pressure release valves, heat exchangers, filters, instrumentation (pressure sensors, flow sensors, pH sensors), mixing tees (static mixers).

The "reverse osmosis unit" as referred to herein comprises a reverse osmosis vessel which includes a number of semi-permeable membranes. The unit may be any suitable reverse osmosis unit. Such units will be known to those of skill in the art. However, by way of example, the unit may comprise hand wound reverse osmosis membranes using Filmtech 8040F membranes and high temperature ADT and permeate tubes or GE Industrial RO elements. Reverse osmosis membranes referred to herein and used by the present inventors were sourced from Membrane Development Specialists, San Diego, USA.

"Feed pressure" refers to the pressure of the geothermal fluid immediately prior to passing through the reverse osmosis unit.

"Sodium hydroxide" may also be referred to as "caustic" herein. The concentration of sodium hydroxide to achieve a particular pH will depend on a number of factors and will be able to be readily ascertained by one of skill in the art.

In general terms, the invention provides a method of producing a silica concentrate from a geothermal fluid having a silica concentration of at least 300 ppm using reverse osmosis. This method comprises the steps of reducing the pH of the geothermal fluid prior to passing the geothermal fluid to a reverse osmosis unit, and passing that geothermal fluid at a temperature of at least 85° C. through a system comprising the reverse osmosis unit to produce a silica concentrate and a permeate. The pH will be reduced to between 4.0 to 7.5 however, should the pH of the geothermal fluid already be less than 7.5, it is preferred that the pH be reduced to a lower level for reasons to be discussed herein.

In order to prevent uncontrolled silica precipitation in equipment carrying geothermal fluids, it is desirable to extract dissolved silica from the geothermal fluid in a concentrated form. The inventors have experimented with different methods of concentrating the silica component of a geothermal fluid stream. Reverse osmosis provides an efficient method to concentrate components of a fluid by providing a membrane through which a permeate (normally water) is forced by high pressure. The components which do not pass through the semi permeable membrane are therefore more concentrated. The permeate may be collected and used for any one of a number of processes including industrial or domestic heating, power generation, irrigation, or as a potable water source. In addition where components of the geothermal fluid pass through the semi permeable membrane, such components will be more concentrated in the permeate.

Reverse osmosis has rarely been trialled to treat geothermal fluid due to issues with scaling and fouling of the reverse osmosis membrane and other equipment. Although it provides scant evidence of successful throughput, WO2009/079047 describes the use of a reverse osmosis system to concentrate silica from low silica (less than 275 ppm) geothermal sources. The low silica concentration of the geothermal fluids obtained from Mammoth Lakes and used in WO2009/079047 is correlated to the relatively low temperature of the geothermal fluids used by the inventors of that application-approximately 50 to 70° C. (paragraph [0040]). At these lower temperatures, the solubility of silica is decreased thus resulting in a lower saturation concentration of the fluid.

In reality the majority of geothermal fluid sources have much higher temperatures thus supporting silica concentrations of greater than 275 ppm. Table 1a and 1b show a number of sources with attendant concentration of a number of components of the fluid.

TABLE 1a

Geothermal source fluid showing concentration of some of the major components

| mg/l | Salton Sea USA | Brawley USA | Imperial USA | Coso USA | Dixie USA | Roosevelt USA | Cerro Prieto Mexico | Miravalles Costa Rica | El Tatio Chile | Hvergerdi Iceland | Broadlands NZ |
|---|---|---|---|---|---|---|---|---|---|---|---|
| Na | 53000 | 47600 | 65500 | 2850 | 407 | 2190 | 8300 | 2300 | 4800 | 212 | 1050 |
| Mg | 33 | 114 | 400 | 0.35 | 0.007 | 0.3 | 0.5 | 0.7 | 0.7 | | 0.1 |
| Ca | 27400 | 21500 | 23700 | 75 | 8 | 10 | 521 | 60 | 250 | 1.5 | 2.2 |
| B | 257 | 221 | 282 | 119 | 9.9 | 27 | 9.4 | 60 | 206 | 0.6 | 48 |
| Al | 2 | 0.5 | 4.2 | | 1.5 | | 0.05 | | | | |
| SiO2 | 461 | 430 | 510 | 711 | 599 | 650 | 864 | 600 | 740 | 480 | 805 |
| CO2 | 1600 | 14600 | | 7800 | 4300 | | 44 | | 5500 | 55 | 128 |
| H2S | 15 | 45 | | 160 | | | | | | 7.3 | 1 |
| SO4 | 64 | 25 | | 5 | 196 | 69 | 2 | 60 | 30 | 61 | 8 |

TABLE 1b

Geothermal source fluid showing concentration of some of the major components

| mg/l | Wairakei NZ | Rotokawa NZ | Tatun Taiwan | Ohtake Japan | Mak-Pan Philippines | Tiwi Philippines | Salak Indonesia | Mote Amita Italy | Asal Djibouti | Milos Greece |
|---|---|---|---|---|---|---|---|---|---|---|
| Na | 1250 | 1525 | 282 | 1210 | 1300 | 2800 | 5000 | 1977 | 29000 | 31500 |
| Mg | 0.04 | | 89 | 0.1 | 0.03 | 0.05 | 0.1 | 0.5 | 30 | 4 |
| Ca | 12 | 50 | | 46 | 21 | 53 | 320 | 128 | 18500 | 4380 |
| B | 29 | 102 | | | 58 | 57 | 312 | 7300 | | 125 |
| Al | | | | 0.28 | | | 0.1 | 0.31 | | |
| SiO2 | 607 | 403 | 170 | 460 | 610 | 600 | 510 | 700 | 470 | 950 |
| CO2 | 17 | 55 | | | | | 5000 | | | 280 |
| H2S | 1 | | 1.7 | | | | 1.5 | | | 2.4 |
| SO4 | 28 | 102 | 1460 | 138 | 28 | 16 | 7 | 26 | 470 | 20 |

As noted in WO2009/079047 (paragraph [0021]) energy extraction from untreated waters at Wairakei, New Zealand (silica concentration approximately 607 ppm) is uneconomical because reducing the temperature to below 130° C. results in uncontrollable silica scaling. Similar issues are said to exist with using other sources with higher (i.e. greater than 275 ppm) silica concentrations. While WO2009/079047 describes a method of extraction of silica using relatively low temperatures and silica concentrations, it is desirable to extract silica from higher temperature fluids with higher silica concentrations. To date, researchers have been unable to extract silica from such fluids using reverse osmosis so as to make energy recovery and silica extraction a commercially viable exercise.

Reverse osmosis units function by way of a pressurised fluid being introduced to a membrane. A portion of the components of the fluid that are smaller than the pore size of the membrane will be forced through by a pressure differential across the membrane thus creating a permeate. The retained components form a concentrate.

The inventors have found that methods described in WO2009/079047 are of limited use when applied to fluids with a silica concentration of greater than approximately 275 ppm (which are generally correlated to a temperature of greater than 70° C.). Example 1 provides details of a trial using conditions generally described in WO2009/079047. During testing the pressure rapidly increased in the system indicating that the reverse osmosis (RO) membrane was fouled. This trial led to irreparable damage to the RO membranes. Carrying out the method described in WO2009/079047 at the higher silica concentrations found at Wairakei results in the uncontrolled precipitation of amorphous silica and other scaling species which fouled the equipment. Autopsy of the RO membrane found that silica precipitated out and blocked the RO membrane. Attempts to clean the membrane using sulphuric acid, hydrochloric acid and hydrofluoric acid were unsuccessful. As a result, the prior disclosed methods were found to be of little use when applied to source fluids with higher silica concentration.

The inventors continued their research on silica concentration and reviewed methods to reduce silica scaling. They followed teaching in the art that describes how fouling of membranes by silica can be avoided by using a pH of 9.5 or higher (e.g. U.S. Pat. No. 5,595,717 col, 4 line 55) and Ning (2002, p 73, line 1). This teaching comes about from the understanding that silica solubility increases rapidly past around pH 9.0 (Iler 1979) thus incentivising use of an increased pH above 9.0 to retain silica in solution.

Example 2 describes a trial using a 7000 L curing tank installed to receive the geothermal fluid from the feed heat exchanger (i.e. after 5 in FIG. 1). This arrangement was designed to allow more time for silica to form colloids prior to the RO membranes. The geothermal fluid from the outlet of the feed heat exchanger 5 fed into the curing tank where it aged for one hour before entering the RO unit. In addition, caustic (sodium hydroxide) dosing was used to increase the pH to 9.3 prior to entering the RO unit. It was surmised that higher pH would promote a faster rate of colloid formation and increased solubility of the silica. This would therefore reduce precipitated silica formation and avoid fouling of the RO membranes, plant pipework and equipment. However, when this higher pH level was tested, the system again experienced pressure increase indicating blocked RO membranes. This is shown by the results of example 1 and 2 where scaling and precipitation occurred on the reverse osmosis membrane surface, resulting in the permeability of the membrane being significantly decreased leading to decreased flux and eventually complete blockage of the system.

The inventors have found that fouling of the RO membranes in the system can be controlled by reducing the pH of the fluid to below about pH 7.5. This step is somewhat unintuitive when employed in the extraction of silica because the solubility of silica increases rapidly above about pH 7.5 (Iler 1979 and Ning 2002 p 69 line 15). Using this lower pH directly conflicted with the initial intuitive approach based on the prior knowledge used by the present inventors in example 2 which aimed to increase the solubility of silica, thus theoretically reducing fouling problems, by increasing pH to 9.3. The present inventors' initial trials using a higher pH of around 9.3 followed the general teaching in the art that fouling of membranes by silica can be avoided by using a high pH of around 9.5 or higher ((e.g. U.S. Pat. No. 5,595,717 col. 4 line 55) and Ning 2002, p 73, line 1)).

Despite this, the inventors carried out research on concentrating the silica in streams with lower pH levels (below about 7.5) and, in addition to employing the other process steps and conditions defined herein, unexpectedly found that silica precipitation was not a limiting factor at such pH levels and the process successfully concentrated silica using an RO process. The inventors also found that lowering the pH provides advantages where the geothermal source contains dissolved carbonates and sulphates which reach saturation in the concentrate from the reverse osmosis process. Since calcium has a particular propensity to form calcium carbonate and sulphate, the invention has particular utility where calcium levels of the source geothermal fluid exceed approximately 5 ppm, 10 ppm, 12 ppm, 15 ppm or 16 ppm.

The inventors changed the trial parameters, and tests were carried out at a higher temperature and with lower pH (see examples 5-10). It was surprisingly found that using these conditions, a concentrate containing silica and other components could be produced via reverse osmosis from a geothermal fluid at high temperature (i.e. greater than 85° C.) and high silica (greater than 300 ppm) concentrations with reduced fouling of the RO membranes.

Reduction of pH to between about 4 and about 7.5 thus addresses issues of calcium and silica precipitation (which can cause scaling and fouling of the RO membranes) but also does not result in deleterious precipitation of silica (as might be expected) at the temperatures and pH used. This is a very surprising and beneficial result.

Accordingly, the invention provides a method for the production of a silica concentrate wherein the pH of the geothermal fluid is reduced to less than pH 7.5, less than pH 6.5, less than pH 6.0, less than pH 5.5, less than pH 5.0, or less than pH 4.5. Preferably the pH is reduced to greater than pH 4.0, greater than pH 4.5, greater than pH 5.0, greater than pH 5.5, greater than pH 6.0, greater than pH 6.5, or greater than pH 7.0. In a particular embodiment, the pH is approximately 4.5, 5.0, 5.5, 6.0, 6.5, 7.0, or 7.5.

The reduction in pH may be achieved by any method known to those of skill in the art but is typically carried out by addition of an acid or another pH reducing substance prior to the fluid entering the reverse osmosis unit. The pH reducing substance may be any pH reducing substance but is preferably hydrochloric acid, sulphuric acid, nitric acid, citric acid, phosphoric acid or an anti-scalant which reduces pH. In the embodiment shown in FIG. 1, an acid is introduced to the fluid at the dosing means 6.

Previous methods dealing with silica extraction from geothermal waters used temperatures of around 50-70° C. At this temperature, problems with silica scaling were not encountered because the concentration of silica in the geothermal fluid is inherently lower, due to the saturation level also being lower. Therefore the problem of silica precipitation is greatly reduced.

The inventors were able to avoid scaling and blockages in the system, even when processing a geothermal fluid at a relatively high temperature. This work opens up the possibility of silica extraction from high temperature source fluids prior to energy recovery which was previously thought not to be possible. In addition, the geothermal fluid treated using the methods described herein may be separated or unseparated geothermal water. By the use of such methods, the inventors have also enabled the extraction of silica from geothermal fluids used in flash steam power plants rather than only binary cycle power plants which operate at a lower temperature. The combination of maintaining a higher temperature (i.e. over 85° C.) and acidifying the feed had never before been considered, at least partly because it had previously been thought desirable to extract silica from the fluid at the earliest possible stage. The inventors have found that maintaining the silica in solution, while simultaneously concentrating the silica enables flow of the fluid and increases the economic viability of the overall process by obtaining a more concentrated silica solution.

Preferably, the geothermal fluid is passed to the reverse osmosis unit at a temperature of between about 85° C. and about 200° C., more preferably between about 100° C. and about 140° C. Preferably, the geothermal fluid is passed to the reverse osmosis unit at a temperature of at least 85° C., at least 90° C., at least 100° C., at least 110° C., at least 120° C., at least 130° C., at least 140° C., at least 150° C., at least 160° C., at least 170° C., at least 180° C. or at least 190° C. Preferably the temperature of the fluid passed to the reverse osmosis unit is less than 200° C., less than 190° C., less than 180° C., less than 170° C., less than 160° C., less than 150° C., less than 140° C., less than 130° C., less than 120° C., less than 110° C., less than 100° C., or less than 90° C. Preferably the temperature of the geothermal fluid is approximately 80° C., 90° C., 100° C., 110° C., 120° C., 130° C., 140° C., 150° C., 160° C., 170° C., 180° C., 190° C. or 200° C.

At this range of temperatures and at a relatively high silica concentration (i.e. over 300 ppm), obtaining a stable silica concentrate with minimal fouling of equipment represents a major advance in the field and has the potential to lead to substantial efficiency gains in geothermal energy power generation. The invention also provides a breakthrough in being able to collect the silica component of the geothermal fluid at high temperatures and high silica concentrations thus increasing extraction efficiency and yield of components from the source fluid.

FIG. 1 shows an embodiment of the invention in which geothermal fluid 1 is passed to a separator 2 to be flashed to produce steam 3 and separated geothermal water (SGW) 4. The SGW 4 is passed to a heat exchanger 5 then inlet pump 7. Acid was introduced to the geothermal fluid flow at a dosing means 6 to reduce the pH and an anti-sealant may also be introduced at the dosing means 6 (although this could be introduced separately). The geothermal fluid is then passed to a reverse osmosis unit 8 to produce a concentrate 9 and a permeate 10. Following reverse osmosis, the concentrate and permeate may be treated with other processes to produce the desired product and concentration. In a particular embodiment in which precipitated silica is produced, the concentrate is passed to a curing tank 11 and to a thickener 12. The precipitated silica is collected 13 while the retained fluid is removed 14. In an alternative embodiment, the concentrate is further concentrated in one or more UF units (not shown in FIG. 1) situated between the curing tank 11 and the thickener 12. The permeate 10 may also be further processed to extract components of the geothermal fluid that have passed through the RO should that be desired.

Figure 2:
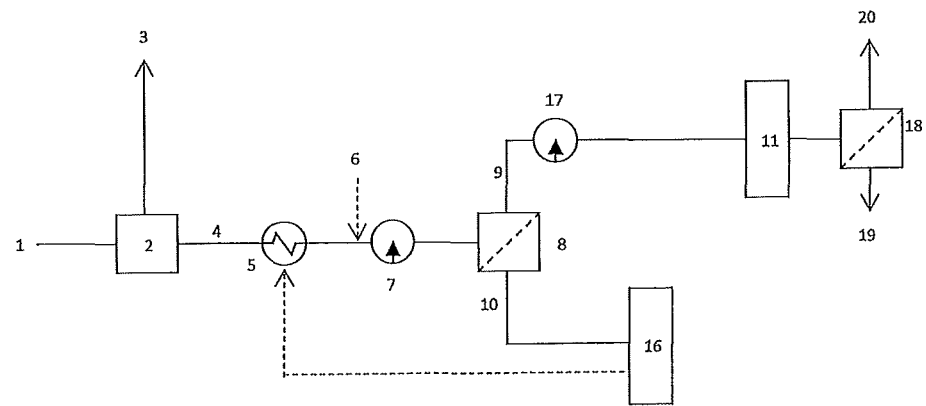
FIG. 2 shows an embodiment of the invention in which a geothermal fluid is received by a reverse osmosis unit, concentrated then processed to produce colloidal silica.

In an alternative embodiment as shown in FIG. 2, colloidal silica is produced. The RO concentrate is cooled 17 before being passed to a curing tank 11 to allow colloids to grow. After a period of growth, the cured concentrate is passed to a UF unit 18. The UF filtrate 19 is typically discharged and the UF retentate 20 may be stored, or further concentrated using RO or UF.

Accordingly, the invention provides a method of producing a silica concentrate from a geothermal fluid, the method comprising:
 a. reducing the pH of the geothermal fluid to between about 4.0 and 7.5 prior to passing the geothermal fluid to a reverse osmosis unit; and
 b. passing the geothermal fluid of a, at a temperature of at least 85° C. through a system comprising the reverse osmosis unit to produce a silica concentrate and a permeate;

wherein the silica concentration in the geothermal fluid is at least 300 ppm.

The inventors have shown that the above method successfully concentrates silica from geothermal fluid. The inventors found however that such methods could be further improved by the introduction of a further step to improve flow of the geothermal fluid flow through the reverse osmosis unit to produce a concentrate. The improvement of flow could be detected by the reduction or elimination of a pressure increase over time in the reverse osmosis unit. The pressure increase indicated fouling of the membrane and improvement of the flow was brought about by minimising the precipitated silica and other scaling species that were produced prior to introduction of the fluid into the reverse osmosis unit.

One option to improve the flow was determined to be removal and replacement of the RO unit cartridges (containing the membranes) as needed to maintain fluid flow. However, this step would be highly undesirable in an industrial context due to the cost and plant downtime that would make this step uneconomically viable. The inventors have, however, surprisingly found that improved flow may be achieved by the addition of one or more of an anti-scalant and a dispersant to the geothermal fluid prior to passing the geothermal fluid to the reverse osmosis unit.

The inventors found that introducing high temperature geothermal fluid to a cool system resulted in the precipitation of silica and other scaling species throughout the system. In addition, the pressure differential between the incoming fluid and the entrained air in the pipework and instrumentation can cause internal flashing or a "water hammer effect" as pockets of the fluid vaporised. These effects can damage equipment including the reverse osmosis unit. In order to address these issues, the inventors found that pre-heating and pre-pressurising the equipment used in the system so as to minimise the temperature and pressure differential between fluid and equipment reduced the incidence of "water hammer" and reduced the likelihood of uncontrolled precipitation and fouling of the system (including the reverse osmosis membrane) by scaling species. Such a preheating step is a very much preferred option.

Example 4 describes a trial using high temperature geothermal fluid and using a high pH of 9.3. To reduce initial precipitation and scaling, the RO unit and other equipment were preheated prior to introducing the geothermal fluid in order to reduce precipitation and scaling of dissolved species as they came into contact with equipment and pipework of a relatively lower temperature. The pre-heating of the system reduced initial scaling and precipitation but the feed pressure during the trial itself still rose quickly from 10 bar to 13.8 bar over the trial duration of 2.5 hours.

Accordingly, the invention provides a method comprising a step of pre-heating the system comprising the reverse osmosis unit prior to passing the geothermal fluid through the unit.

Preferably, the method includes a step of pre-heating the system comprising the reverse osmosis unit to a temperature approximately equal to the temperature of the incoming fluid. Preferably the temperature of the system is between about 70° C. and about 200° C. prior to passing the geothermal fluid through the system. Preferably, the method includes a step of maintaining the system comprising the reverse osmosis unit at a temperature of between about 70° C. and about 200° C. while the geothermal fluid passes through the unit.

Preferably, the system comprising the reverse osmosis unit is preheated to or maintained at a temperature substantially equal to the temperature of the fluid passed to the reverse osmosis unit. Preferably, this temperature is at least 70° C., at least 80° C., at least 90° C., at least 100° C., at least 110° C., at least 120° C., at least 130° C., at least 140° C., at least 150° C., at least 160° C., at least 170° C., at least 180° C. or at least 190° C. Preferably the system comprising the reverse osmosis unit is preheated to or maintained at less than 200° C., less than 190° C., less than 180° C., less than 170° C., less than 160° C., less than 150° C., less than 140° C., less than 130° C., less than 120° C., less than 110° C., less than 100° C., less than 90° C., or less than 80° C. Preferably the system comprising the reverse osmosis unit is pre-heated to and or maintained at approximately 70° C., 80° C., 90° C., 100° C., 110° C., 120° C., 130° C., 140° C., 150° C., 160° C., 170° C., 180° C., 190° C. or 200° C.

The inventors determined that a particularly effective method to pre-heat the system is to use heat from the geothermal fluid stream to heat a pre-heating stream by way of a heat exchanger as described in example 3. This method of preheating the system forms a preferred aspect of the present invention.

Further the inventors also found that re-routing the permeate stream previously collected from the reverse osmosis unit through a heat exchanger and then back into the reverse osmosis unit is also an effective and cost-efficient method to pre-heat the system. Although other sources could be used, using cooled SGW would be generally undesirable due to the high level of dissolved species that would likely precipitate out and foul equipment. Preferably, the reverse osmosis unit is pre-heated by a pre-heating stream received from a heat exchanger, wherein the heat exchanger receives geothermal fluid at a temperature sufficient to transfer heat via the heat exchanger to the pre-heating stream. This method of preheating the system also forms a preferred aspect of the present invention.

Preferably, the pre-heating stream is received at the heat exchanger from a collection tank containing permeate previously collected from the reverse osmosis unit.

In order to efficiently extract silica from a solution, it is desirable to use the concentrate at a relatively high silica concentration. The higher the concentration of silica in the concentrate, the more is able to be extracted. In addition, in an industrial context, it is possible that extraction of silica from the fluid will take place at a different location and different time to the energy extraction and silica concentration. In these situations it is desirable for a number of reasons (e.g. logistical and cost) to have a highly concentrated silica solution.

The inventors have found that using a geothermal fluid with silica concentration of greater than 300 ppm enables the use of a single RO unit while still producing a silica concentrate of at least 600 ppm when running the process at a stable 50% recovery rate. Below 600 ppm, the inventors believe that the concentration of silica will be insufficient to obtain a commercially viable yield of precipitated silica from downstream processes. There are also advantages in decreased costs associated with only using a single RO unit. Preferably, the concentration of silica in the geothermal fluid is at least 300 ppm. More preferably, the concentration of silica in the geothermal fluid is at least 400 ppm, at least 500 ppm or, at least 600 ppm.

Thus the invention provides a method of producing a silica concentrate with a silica concentration of at least 600 ppm, at least 700 ppm, at least 800 ppm, at least 900 ppm, at least 1000 ppm, at least 1100 ppm, at least 1200 ppm, at least 1300 ppm, at least 1400 ppm, at least 1500 ppm, at least 1600 ppm, at least 1700 ppm, at least 1800 ppm, at least 1900 ppm, at least 2000 ppm, at least 2100 ppm, at least 2200 ppm, at least 2200 ppm, at least 2300 ppm, at least 2400 ppm, at least 2500 ppm, at least 2600 ppm, at least 2700 ppm, at least 2800 ppm, at least 2900 ppm, at least 3000 ppm, at least 4000 ppm, or at least 5000 ppm. Further steps may be carried out as part of the processes described herein to produce more highly concentrated solutions. For example further reverse osmosis or ultrafiltration may be carried out to produce a concentration of at least 3000 ppm, 4000 ppm, 5000 ppm, 10000 ppm, 15000 ppm, 20000 ppm, 25000 ppm, 30000 ppm, 35000 ppm.

As well as providing a silica concentrate, the invention also provides a method for the production of a concentrate or permeate further including at least one of a platinum group metal, zinc, lead, copper, manganese, rare earth metals, lithium, arsenic, antimony, boron, caesium, rubidium, bromine, iodine, strontium and barium sulfate, calcium carbonate, calcium chloride, potash, table salt, and sodium sulfate.

The permeate obtained from the reverse osmosis step comprises mainly water. As such, the invention further provides a method of production of water from a geothermal fluid. Preferably the water is substantially pure water. Water produced by the methods described herein may be used for any appropriate use. However, by way of example, it may be used for domestic heating, power generation, irrigation, or as a potable water source.

Some dissolved components of the fluid may also pass through the reverse osmosis membrane that are desirable to collect and extract. In particular, the permeate preferably comprises boron.

The reverse osmosis unit should be run at an operating pressure which results in a high recovery rate and therefore high concentration of the components in the concentrate. Preferably, the standard operating pressure of the reverse osmosis unit is from 1000-2500 kPag.

In order to control permeate production, the inventors introduced a pressure control valve to the concentrate stream after the reverse osmosis unit (17 in FIG. 1). This valve was intended to be used to modulate the amount of permeate recovery by modulating the pressure across the semi-permeable membrane. As noted above, during operation it was observed that the pressure would build up in the reverse osmosis unit while permeate production would stay substantially constant. In order to release the pressure, the pressure control valve was activated and the pressure reduced.

When the pressure was reduced it was observed that shortly after this pressure release event, once the pressure had been restored, permeate production was unexpectedly increased. This step was surprisingly found to improve flow of the geothermal fluid through the reverse osmosis unit. This step was employed in examples 6 and 7. Accordingly, this step may be incorporated in a preferred method for concentrating high temperature, high silica geothermal fluids to produce a silica concentrate without scaling or fouling of the equipment. Without wishing to be bound by theory, it is believed that during continuous use, flux through the reverse osmosis membrane decreased due to a build-up of silica particles on the membrane. The build-up was detectable by the increased pressure across the membrane. Without periodic pressure release, this reduction in flux would increase and lead to the complete ceasing of throughput as fouling of the membrane and equipment increased to unmanageable levels.

Accordingly, employing periodic reduction of pressure of the RO unit increases overall flux through the unit and provides advantages over previous methods by enabling the production of a concentrate containing desirable components such as silica without fouling of equipment. Preferably the pressure at the reverse osmosis unit is reduced by activating a pressure control valve in the silica concentrate stream exiting the reverse osmosis unit.

Preferably, the pressure at the reverse osmosis unit is reduced when the silica concentrate stream reaches a predetermined threshold pressure. The threshold pressure will be predetermined based on a number of factors including the rated pressure for the reverse osmosis unit and the permeate recovery rate. Preferably the threshold pressure is set at about 100 kpag above the standard operating pressure, or 200 kpag, or 300 kpag, or 500 kpag above.

Preferably, the pressure at the reverse osmosis unit is reduced when the predetermined threshold pressure is reached or exceeded for a period. Preferably the threshold pressure reached or exceeded for a period is from approximately 1000-2500 kPag. More preferably the threshold pressure reached or exceeded for a period is approximately 1800 kPaG. Preferably the period is between about 1 second and about 45 minutes, more preferably about 1 minute to 30 minutes.

Preferably, the pressure at the reverse osmosis unit is reduced by at least 50% of the threshold pressure. Preferably the pressure is reduced to approximately the standard operating pressure, or within plus or minus approximately 10, 20, 50 or 100 kpag of the standard operating pressure. Preferably the pressure is reduced to approximately 600 kPaG.

Preferably, the pressure at the reverse osmosis unit Is reduced once every two hours.

Preferably, the reduced pressure is held at a substantially constant level for a period of time before rising to a standard operating pressure as described above. Preferably, the pressure at the reverse osmosis unit is held at the reduced pressure for between about 1 second and 30 minutes, more preferably between about 2 and about 5 minutes.

It is believed that this periodic reduction in pressure results in the geothermal fluid flushing the colloids from the membrane surface through the unit which then exits as part of the concentrate stream. Thus during the pressure reduction event, the concentrate stream is slightly diluted. Typically, the diluted stream is sent to waste.

The periodic reduction in pressure to flush the membrane enables a high silica concentration fluid to be used because it permits colloid formation even prior to the reverse osmosis unit. Colloid formation is then continued after the concentrate is passed to the curing tank. This early colloid formation is a surprising advantage of the process of the invention and achieves a reduced throughput time to achieve optimal colloid formation by enabling an earlier start to colloid formation. In addition, the process can be used with fluid sources where colloid formation cannot realistically be prevented or controlled prior to the fluid being received. Such fluid sources typically comprise high silica concentrations and temperatures.

Recovery rate of permeate from brackish waters using reverse osmosis systems is typically around 75% (see for example U.S. Pat. No. 6,537,456 B2). However, apart from the disclosure of WO2009/079047, the inventors are not aware of any other attempts to use reverse osmosis systems with geothermal feeds. Although the inventors tested recovery rates suggested by literature from similar fields, it was found in some configurations that running the process with periodic reduction of pressure using recovery rates above 70% resulted in rising pressure within the RO unit indicating that flow was being inhibited by precipitated silica and scaling species causing the RO membranes to become fouled. This was despite the fact that the inventors maintained the geothermal fluid at high temperature in an attempt to maintain solubility of the dissolved silica. On inspection of the blocked membranes, it was found that the periodic diversion of the RO stream to the concentrate stream resulted in preferential flow paths being formed within the membrane. Over time, these preferential flow paths resulted in some areas of the membrane experiencing higher flow thus more wear and increased fouling.

The inventors continued their research and found that a further option to improve the flow of geothermal fluid through the RO unit comprised reducing the recovery rate to below about 70%. In combination with the other required features of the invention, this resulted in a stable pressure within the RO unit indicating that any precipitated silica species were passing through the membrane successfully.

Preferably, the recovery rate of the reverse osmosis step is less than 70%, less than 65%, less than 60%, less than 55%, less than 50%, or less than 45%. Preferably the recovery rate of the reverse osmosis is greater than 40%, greater than 45%, greater than 50%, greater than 55%, greater than 60%, or greater than 65%, Preferably the recovery rate of the reverse osmosis is approximately 40%, 45%, 50%, 55%, 60%, 65% or approximately 70%.

Preferably the feed pressure of the geothermal fluid is substantially constant relative to the recovery rate of the reverse osmosis step during substantially continuous operation of the process. Preferably, the feed pressure of the geothermal fluid increases by less than 5%, less than 4%, less than 3%, less than 2%, less than 1%, less than 0.5% or less than 0.1% relative to the recovery rate of the reverse osmosis step over a representative period of one hour substantially continuous operation of the process.

Substantially continuous operation of the process refers to a process for the concentration of silica in which minor fluctuations in RO concentrate production are ignored, and a longer term view of the entire process is taken. Under ideal conditions, the feed pressure of the RO unit will stay substantially constant provided the RO recovery also stays constant. This indicates that the membrane is allowing a constant throughput of silica concentrate and the membrane pores are not becoming fouled. Increased fouling will lead to the RO membrane requiring more regular cleaning and possibly replacement. A representative period of one hour could be an hourly average pressure increase over the course of a trial run. Alternatively, a representative period of one hour could be a period of RO concentrate flow during which there were zero or only minor interruptions in RO concentrate flow.

Reverse osmosis membranes and flow passages within membranes are prone to scaling due to precipitation of sparingly soluble fluid components such as calcium carbonate, calcium sulphate, barium sulphate and strontium sulphate. Most natural waters contain concentrations of calcium, sulphate and bicarbonate ions (see table 1a and 1b above). The inventors surprisingly found that an option to improve the flow of geothermal fluid through the RO unit comprised the addition of an anti-scalant and/or a dispersant to the geothermal fluid prior to passing the geothermal fluid to the reverse osmosis unit. Use of an anti-scalant and/or a dispersant, in conjunction with the other steps of the process of the present invention, allowed the process to be run more efficiently with a reduced need to stop the process to clean the membranes.

Accordingly, in order to decrease precipitation of components of the fluid and therefore prevent scaling, an anti-scalant and/or a dispersant may be added to the fluid. Preferably, these are added to the fluid prior to passing the fluid to the reverse osmosis unit. Anti-scalants and dispersants may be any that are known to be of use to a skilled person. Suitable anti-scalants and dispersants will be known to those of skill in the art. By way of example, Nalco Geo 980 dispersant (Nalco NZ Limited) may be used and the anti-scalant may be Nalco Geo 905 or Nalco PC-510T (Nalco NZ Limited). Dosing of the anti-scalant/dispersant is dependent on the concentration of silica and other scaling species. Typically, dosing is conducted according to manufacturer's instructions.

It is particularly preferred that both an anti-scalant and a dispersant are used in the process of the present invention to optimise the efficiency of the process. One or both can be used with a periodic reduction in pressure, as described previously, if desired.

Once a concentrate is obtained from the reverse osmosis unit, it may be subjected to a number of further steps in order to grow the silica colloids and/or further concentrate the silica in solution. Desirable components of the geothermal fluid may be extracted by any methods known to those of skill in the art. The invention therefore provides a method of extraction or removal of a component of the geothermal fluid, the method comprising the steps of concentrating the component followed by a step of removing the component from the concentrated solution. Components of the geothermal fluid may be obtained by standard methods known in the art.

The silica concentrate obtained from the RO process may be passed to a curing tank to produce a cured silica concentrate stream. The curing tank allows silica colloids to grow by spontaneous agglomeration to form an increased size colloidal silica.

Preferably, the silica concentrate is further processed to produce at least one of precipitated silica or colloidal silica. Further processing methods will be known to those of skill in the art. Preferably however, the further processing comprises one or more of the following steps:

Preferably, the further processing comprises one or more of the following steps:
  a. passing the silica concentrate to a curing tank to produce a cured silica concentrate;
  b. removing colloidal silica through the use of an ultrafiltration unit
  c. addition of a precipitant to the silica concentrate
  d. stirring the silica concentrate
  e. passing the cured silica concentrate solution to a thickener
  f. addition of a flocculant
  g. passing the silica concentrate and/or a supernatant produced by the second or further RO unit to increase silica concentration or recovery
  h. passing the silica concentrate of the second or further RO unit to a curing tank
  i. washing the cured silica concentrate with hot water
  j. washing the cured silica concentrate with acid
  k. drying the silica concentrate to yield precipitated silica powder.
  l. further concentrating the silica in the silica concentrate by ultrafiltration.

Preferably the precipitant is hydroxide ions, NaCl, CaCl, $FeCl_3$, Polyaluminum chloride or PLC.

Preferably, the further processing produces precipitated silica and the further processing comprises at least one of the following steps:
  a. passing the silica concentrate to a curing tank to produce a cured silica concentrate;
  b. Increasing the concentration of the silica concentrate through the use of a UF unit
  c. addition of a precipitant to the silica concentrate to precipitate the silica
  d. stirring the silica concentrate
  e. further concentrating the silica in the silica concentrate by ultrafiltration.
  f. passing the cured silica concentrate solution or the precipitated silica solution to a thickener
  g. addition of a flocculant h. passing the silica concentrate of the second or further RO unit to a curing tank
i. passing the silica concentrate from the UF unit to the curing tank to increase silica recovery
j. washing the precipitated silica concentrate with hot or cold water (diafiltration)
k. washing the cured silica concentrate with hot water to dissolve salts (e.g. halide compounds)
l. washing the precipitated silica concentrate with acid
m. drying the silica concentrate to yield precipitated silica powder.

Preferably, the further processing produces colloidal silica and the further processing comprises at least one of the following steps:
a. passing the silica concentrate to a curing tank to produce a cured silica concentrate;
b. concentrating colloidal silica through the use of an ultrafiltration unit
c. diafiltrating the UF concentrate with RO permeate to reduce salt concentration
d. passing the silica concentrate produced from the UF unit through a second or further RO unit to increase silica recovery
e. further concentrating the silica in the silica concentrate by ultrafiltration.

The inventors have found that increasing the pH of the concentrate (by addition of sodium hydroxide or another suitable basic agent) after leaving the RO unit results in surprisingly high production of silica colloids. Despite increasing the silica saturation level, the increased hydroxide present is believed to have catalysed the polymerisation of monomeric silica thus inducing the production of colloidal silica. Although the methods described herein could be used without the addition of this step, the production of silica colloids would be reduced and the efficiency of the post-RO processes to concentrate the silica will be considerably decreased.

Accordingly, in a particular embodiment, the further processing comprises further concentrating the silica in the silica concentrate by ultrafiltration. Preferably, the pH of the silica concentrate is raised prior to passing the silica concentrate to one or more ultrafiltration units. Preferably, the pH is increased by adding sodium hydroxide to the silica concentrate. Preferably, the pH is increased to at least 7.5, at least 8.0, at least 8.5, at least 9.0, or at least 9.5. Preferably the pH is increased to approximately 7.5, 8.0, 8.5, 9.0, 9.5 or 10.0. This embodiment may be carried after the RO process described in any of the previous embodiments of the invention.

Preferably, the UF pre-treatment process further comprises curing the silica concentrate to produce a cured silica concentrate. The silica concentrate is cured for a period to allow the silica colloids to grow. Preferably the curing occurs in one or more curing tanks. Preferably, the curing time is between 5 minutes and 2 hours. Preferably, the curing time is approximately 30 minutes. Preferably, the curing time is selected from the group consisting of greater than 5 minutes, greater than 10 minutes, greater than 15 minutes, greater than 30 minutes, greater than 1 hour, greater than 2 hours, less than 6 hours, less than 2 hours, less than 1 hour, less than 30 minutes, less than 15 minutes, between 10 minutes and 1 hour, between 10 minutes and 45 minutes, approximately 5 minutes, approximately 10 minutes, approximately 15 minutes, approximately 20 minutes, approximately 30 minutes, approximately 45 minutes, approximately 1 hour and approximately 2 hours.

Preferably, the silica concentrate or the cured silica concentrate is further concentrated by ultrafiltration in at least one ultrafiltration unit to yield a first UF retentate. Preferably, the silica concentration of the first UF retentate is selected from the group consisting of greater than 0.1 m %, greater than 0.5 m %, greater than 1 m %, greater than 1.5 m %, greater than 2 m %, greater than 5 m %, greater than m %, greater than 10 m %, greater than 15 m %, between 0.1 m % and 20 m %, approximately 0.5 m %, approximately 1 m %, approximately 1.5 m % and approximately 2 m %, approximately 3 m %, approximately 4 m %, approximately 5 m %, approximately 10 m %, approximately 15 m %, and approximately 20 m %.

Preferably the first UF retentate is further concentrated at a second or further UF unit to yield a second or further UF retentate. Preferably, the second or further UF unit produces a second or further UF retentate of at least 10 m %. Preferably, the second or further UF unit produces a UF retentate wherein the silica concentration is selected from the group consisting of greater than 2 m %, greater than 5 m %, greater than 10 m %, greater than 15 m %, greater than 20 m %, greater than 30 m %, greater than 40 m %, between 2 m % and 50 m %, approximately 10 m %, approximately 20 m %, approximately 30 m %, approximately 40 m % and approximately 50 m %. Diafiltration may be carried out to reduce the salt content of any one or more of the UF feeds.

Preferably, the first, second or further UF retentate comprises at least one of colloidal silica and precipitated silica. Ultrafiltration to produce a first, second or further UF retentate may be used after any of the previously described processes comprising reverse osmosis, or variations thereof.

Without wishing to be bound by theory, it is hypothesised that since an anionic based silica colloid has a partially negative surface charge, hydroxide (OH—) which is also negative will promote the negative surface of the colloids to help keep them in suspension. Polymerization continues until all oversaturated monomeric particles have been 'consumed'.

Preferably, the method includes a further step of addition of a precipitant to a colloidal silica concentrate to produce precipitated silica. Preferably the precipitant is hydroxide ions, NaCl, CaCl, $FeCl_3$, Polyaluminium chloride or PLC. Preferably the pH is increased prior to addition of the precipitant. Precipitated silica may be produced by adding a precipitant to a silica concentrate prepared any of the methods referred to herein, for example by the RO methods described herein, or the UF methods which produce a more highly concentrated silica concentrate, with or without curing. The silica concentrate is treated with a precipitant in a thickener or similar apparatus and the precipitated silica sludge removed. The increase in pH and/or addition of the precipitant assists the precipitation process and increases overall yield of precipitated silica.

Preferably the method further comprises extraction of one or more of the concentrated components from at least one of the fluids comprising a concentrated level of silica described herein. Preferably the fluid is the silica concentrate, permeate, cured silica concentrate, second silica concentrate or UF retentate.

The geothermal fluid preferably comprises further components selected from at least one of platinum group metals, zinc, lead, copper, manganese, rare earth metals, lithium, arsenic, antimony, boron, caesium, rubidium, bromine, iodine, strontium and barium sulphate, precipitated calcium carbonate, calcium chloride, potash, table salt, and sodium sulphate. Accordingly, the invention further provides a method of concentration of at least one further component.

Prior art processes generally limit themselves to consideration of extraction of silica from cooled geothermal waters downstream of a geothermal energy extraction system. For example WO2009/079047 states in paragraph [0040] that the geothermal fluid was obtained downstream from the power plant exchanger. Also Harper (1992) provides a flow diagram showing precipitation of silica from a source feed of 70-80° C. downstream of a binary cycle turbine. Preferably the geothermal fluids used by the processes of the present invention are from naturally pressurised sources such as from a flash plant (i.e. separated geothermal water). The natural propensity for such fluids at high temperatures to exert a pressure has advantages in maintaining the pressure of the system required for reverse osmosis processing without requiring additional pumps and consequent energy use. Accordingly, the system comprises a naturally pressurised system without the use of pumps or other expensive and maintenance-intensive equipment.

REFERENCES

Harper et al. 1992-Towards the efficient utilization of geothermal resources. Geothermics 21, pp 641-651;
Harper, 1997—U.S. Pat. No. 5,595,717A—Controlled precipitation of amorphous silica from geothermal fluids or other aqueous media containing silicic acid.
R. K. Iler, The Chemistry of Silica, John Wiley & Sons, New York, (1979).
Ning (2002), Desalination 151 p 67-73.

EXAMPLES

Example 1

Use of Method Described in WO2009/079047 for Extraction of Silica in >275 ppm Silica Solutions Separated geothermal water (SGW) was introduced into a system at 60° C. comprising a reverse osmosis unit.
Reverse Osmosis membrane arrangement: RO #1: Nano RO #2: Nano RO #3: Nano

TABLE 2

Operating conditions for example 1

| Feed (l/s) | Recovery (%) | Inlet T (° C.) | pH |
|---|---|---|---|
| 1.3 | 50 | 60 | 7.5 |

The feed pressure increased immediately and the trial was ended after 20 minutes. The increase in pressure indicated that the membranes became fouled.
In an attempt to recover the membranes after this first SGW run, both a high pH and low pH clean in place (CIP) was carried out. The trial was repeated using elements from a different manufacturing batch but these new membranes also became blocked. It was concluded that the membranes were irreparably blocked by scaling and formation of amorphous silica. New membranes were required to be installed. It was concluded that the low inlet temperature resulted in silica and other components of the geothermal fluid precipitating and causing the membrane blockage.

Example 2

Caustic Dosing to Increase Solubility of Silica

An alternate method was trialled which involved the use of a curing tank and caustic dosing prior to entering the reverse osmosis unit.

A 7000 L curing tank was installed to receive the geothermal fluid from the feed heat exchanger (i.e. after 5 in FIG. 1). The geothermal fluid from the outlet of the feed heat exchanger 5 fed into the curing tank where it cured for one hour before entering the RO unit.
Sodium hydroxide dosing to increase the pH was used in order to promote silica solubility and colloid formation so that it would pass through the RO membranes. It was also believed that bigger particles (silica colloids as opposed to dissolved silica) would be better rejected by the RO membranes, and so less silica would be transmitted into the RO permeate stream. Also by displacing the dissolved/monomeric silica from solution this would remove the 'reactive' silica thereby making silica scaling of the RO membranes less likely to occur.
Process Conditions
1. Separated Geothermal Water (SGW) entered the plant at a total silica concentration between 500-550 ppm and was ~126° C.
2. The geothermal fluid was cooled from 126° C. to 55° C. using a plate heat exchanger at the plant inlet. The cooled geothermal fluid was sent to the curing tank for a period of 60 minutes.
3. From the curing tank the geothermal water was pumped through a series of 100 micron and 10 micron cartridge filters to remove any particulate material before entering the RO units.
4. Sodium Hydroxide was dosed downstream of the heat exchanger and mixed into the feed using an in-line static mixer. The Sodium Hydroxide increased the pH from its native (8.4) to pH 9.3.
5. SGW then passed through three vessels each containing two 8-inch RO membranes. The RO feed entered the first vessel, sending the concentrate from the first RO vessels into the second vessel and concentrate from the second vessel into the third vessel.
6. The RO concentrate and RO permeate were cooled by plate heat exchangers individually to 60° C. and 50° C. respectively. Concentrate and permeate from the RO were fed an RO concentrate tank and permeate tank to await further processing.
Reverse Osmosis membrane arrangement: RO #1:Nano RO #2: Toray RO #3: Toray
Operating Conditions

TABLE 3

Operating conditions for example 2

| Feed (l/s) | Recover (l/s) | Inlet T (° C.) | pH |
|---|---|---|---|
| 1.98 | 52% | 55 | 9.3 |

Figure 3:
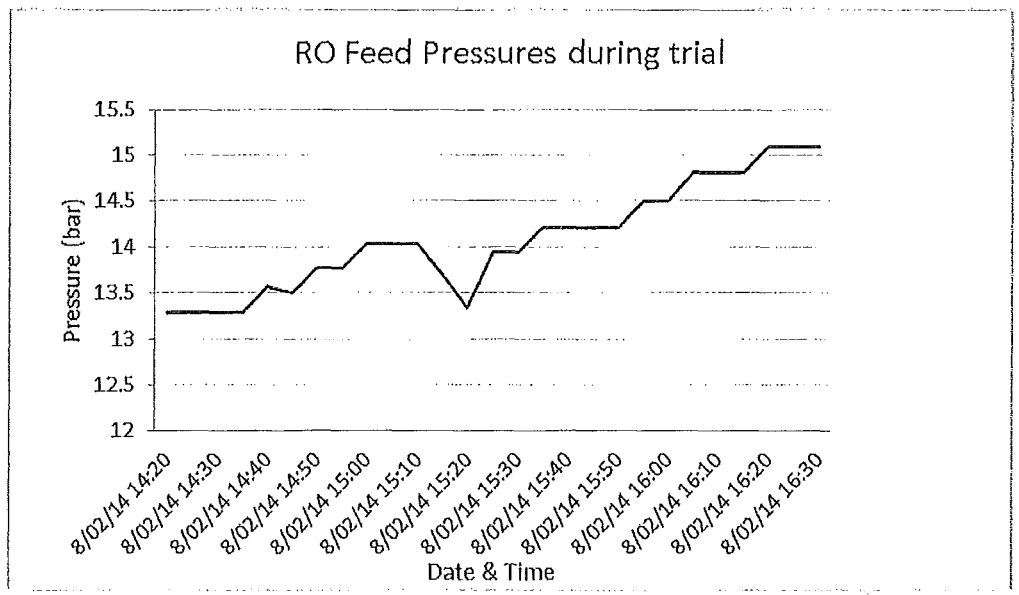
FIG. 3 shows the RO feed pressure for the trial described in example 2

Results
FIG. 3 shows how the RO feed pressure rose during the trial. The RO feed pressure was originally 13.3 bar and gradually increased to 15.1 bar within approximately 135 minutes of operation. This indicates an increase of feed pressure of approximately 6.02% per hour of continuous operation.
Although the fluid traversed through the curing tank for a retention time of 60 minutes the monomeric silica concentration reduced by an average of only 90 ppm. Assuming this difference of 90 ppm went into silica colloids; this approach had little effect at displacing reactive silica from solution.
Under idealized conditions the monomeric silica concentration of the RO concentrate would double relative to the feed concentration. However, the average RO feed concentration was 360 ppm, and the concentrate stream was only 570 ppm; nowhere near double this (720 ppm). This shows the RO membranes exhibited poor rejection of silica, and the silica content of the permeate stream must have been quite high or this discrepancy in silica was being lost onto the RO membrane itself.

Conclusion

The rise in pressure while maintaining the same flow rate indicates that the RO membrane became progressively more blocked with silica. The pressure increases to maintain the same flow using the remaining membrane pores.

Since silica saturation level increases rapidly at pH>8.5 a decreased amount of polymerisation to form precipitated silica would be expected at this pH (and consequently less fouling of the membrane). However, it was found that the higher pH and ageing did little to reduce fouling. With hindsight, the inventors believe that although pH may have increased solubility, this effect was outweighed by the remaining monomeric silica having a greater tendency to polymerise at this higher pH.

Figure 4:
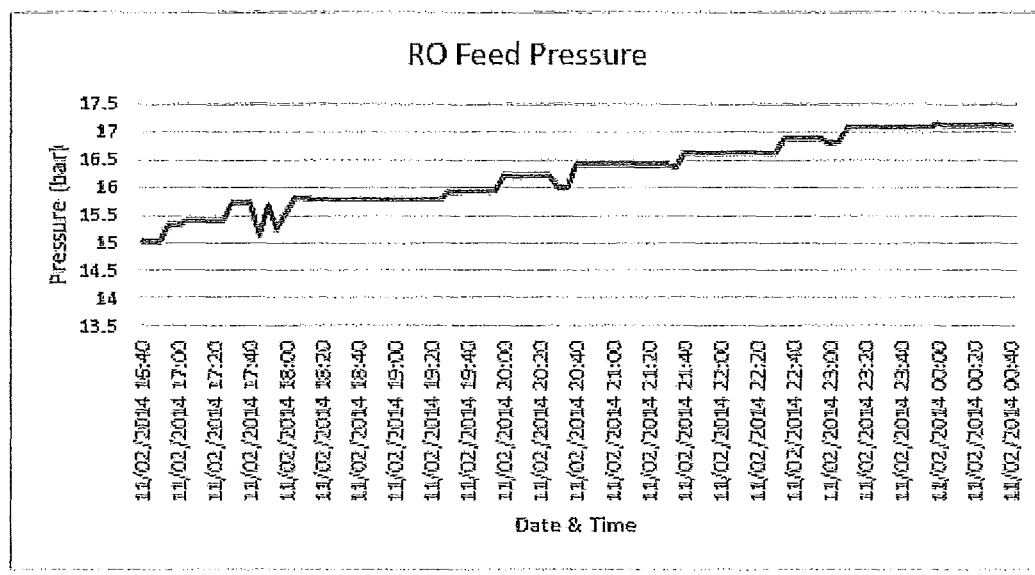
FIG. 4 shows the RO feed pressure for the trial described in example 2 but with the modification that a permeate stream was added to the SGW feed.

Various retention times in the pre-RO curing tank were tested (1 and 1.5 hour) as well as pH levels of 9.3 and 9.4. There were no significant differences seen between the different retention times and pH levels. A further trial was carried out using caustic dosing in which a permeate stream was added to the SGW in order to reduce the silica concentration and assist passage through the RO unit. This trial resulted in a pressure increase (see FIG. 4) in the RO feed of approximately 1.75% per hour of continuous operation. This indicated that the recycling the permeate stream in conjunction with a high pH did not prevent fouling of the membranes.

Example 3

Pre-Heating

Modifications were made to the equipment of example 1 and 2 to accommodate an RO vessel pre-heating procedure. With reference to FIG. 1, the preheating procedure is as follows:
1. Geothermal fluid entered the system through the main feed line 4, passed through the feed heat exchanger 5 and through an optional diverted feed 15 to a curing tank 11. This curing tank was open to drain and disposed of the geothermal fluid.
2. The preheating stream used for this RO pre-heating process was received from a permeate collection tank 16 which contained either permeate or supplied town water.
3. The preheating stream passed from the feed heat exchanger 5 at approximately 70° C. to the main system prior to the inlet pump 7 which fed into the main process path for the RO unit 8.
4. The RO pre-heating procedure was operated for approximately one hour.

The pre-heating procedure effectively warmed up the pilot plant prior to introducing hot geothermal water into the plant. The use of this pre-heating system reduced water hammer and increased fluid throughput.

Example 4

High Temperature Trial

A further trial was carried out using fluid at a high temperature (112° C.). All other variables remained constant and the effect of the higher RO feed temperature would be observed during this run.

Operating Conditions
1. The pilot plant was pre-heated according to the procedure outlined above prior to introducing hot geothermal water into the system.
2. Separated Geothermal Water (SGW) was sourced with a total silica concentration between 500-550 ppm and was ~126° C.
3. From the heat exchanger the geothermal water was pumped through a 100 and 10 micron cartridge filter to remove any particulate material before entering the RO units.
4. Sodium Hydroxide was dosed downstream of the heat exchanger and mixed into the feed using an in-line static mixer. The Sodium Hydroxide increased the pH from its native (8.4) to pH 9.3.
5. The SGW then passed through three vessels each containing two 8-inch RO membranes. Concentrate and permeate from the RO were fed to a concentrate holding tank and a permeate tank to await further processing.
6. SGW was cooled then maintained at 112° C. with a feed flow rate of 1.3 L/s.
7. The reverse osmosis unit operated at a nominated recovery of 50% which would result in total silica concentrations doubling to 1000-1100 ppm in the reverse osmosis concentrate from the original SGW feed of approximately 500 ppm, under idealized rejection operation.

Results

The pressures in the RO system during this period are shown in FIG. 5.

Conclusions

Figure 5A:
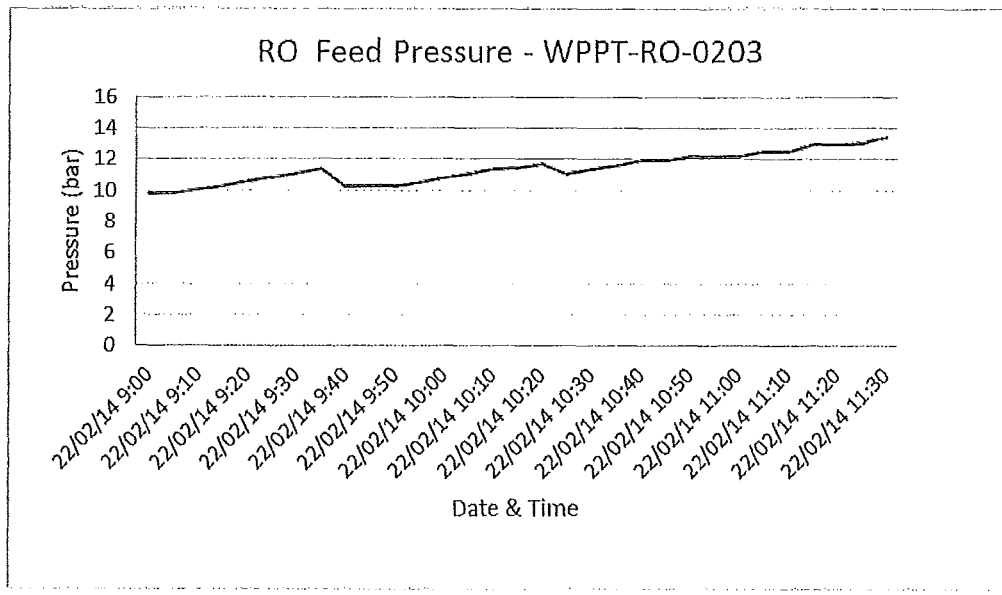
FIG. 5A shows the RO feed pressure for the trial described in example 4.

The pressures in the RO system continued to rise during this trial from 10 bar to 13.8 bar as seen in FIG. 5A. This indicates that the fouling rate was still high causing the RO pressure to rise. The pressure increase was approximately 15.2% per hour of continuous operation.

Figure 5B:
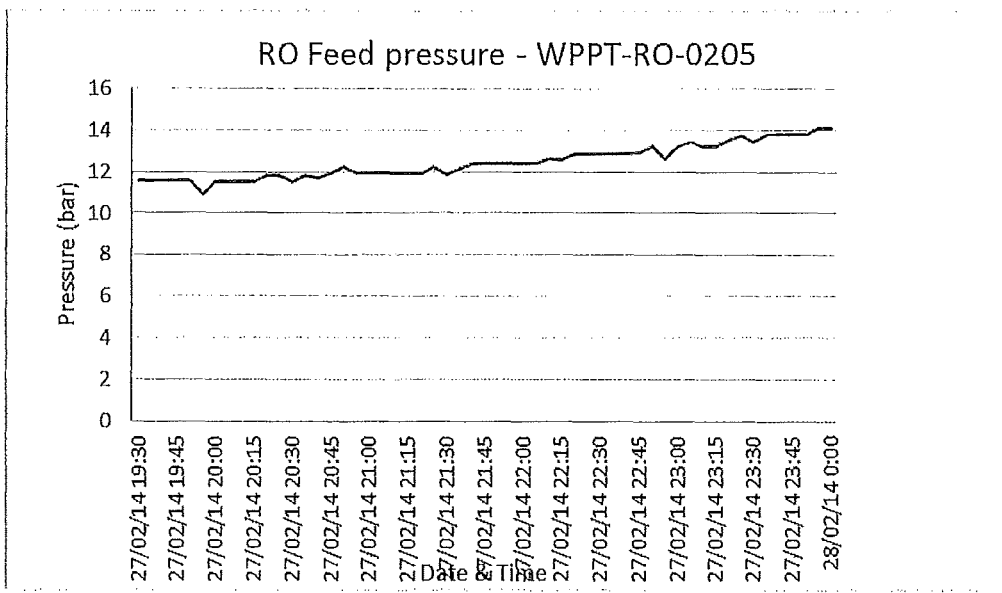
FIG. 5B shows the RO feed pressure for the trial described in example 4 but with an anti-scalant present.

A further trial was carried out with identical process conditions apart from an anti-scalant (PC-510T) dosed at 9.8 ppm at the sodium hydroxide dose point. FIG. 5B shows the RO feed pressure for this trial. It can be seen that the RO feed pressure rises from 11.6 bar to 14.1 bar over the 4.5 hour trial period. This equates to an increase in feed pressure of 4.8% per hour.

Example 5

The objective of this trial was to achieve steady conditions in the Reverse Osmosis (RO) unit without encountering a significant feed pressure increase. In order to achieve this, a new process variable on the RO plant was tested:—Hydrochloric acid was dosed at the RO feed to reduce the pH instead of Sodium Hydroxide (as per previous trials) which increased the pH of the fluid at this point.

Operating Conditions
1. The system was pre-heated with RO permeate prior to introducing hot geothermal water into the system (see above for pre-heat procedure).
2. After the pre-heat procedure was complete, SGW was quickly introduced into the plant to prevent any heat loss.
3. Separated Geothermal Water (SGW) was sourced with a total silica concentration between 500-550 ppm and was ~126° C.
4. The hot geothermal water was cooled from 126° C. to 80° C. using a plate heat exchanger.

5. From the heat exchanger the geothermal water was pumped through a 100 micron and a 10 micron cartridge filter in series to remove any particulate material before entering the RO units.
6. Hydrochloric acid was dosed downstream of the heat exchanger and mixed into the feed using an in-line static mixer. The Hydrochloric Acid decreased the pH from its native (8.4) to pH 6.
7. Antiscalant was added downstream of the acid dosing point and upstream of the pre-filters.
8. The SGW was passed through three vessels each containing two 8-inch RO membranes.
9. The RO concentrate and RO permeate were cooled by plate heat exchangers individually to 60° C. and 50° C. respectively and stored to await further processing.
10. Periodic reduction of pressure of the RO unit was employed (fast forward flushes) every hour to reduce the rate of the RO feed pressure rise. The objective of the fast forward flush was to direct all of the RO feed flow to the RO concentrate stream to increase the cross flow velocity across the membrane which would dislodge potential deposits mechanically.

Anti-scalant: PC-510T was used to prevent silica from precipitating prior to entering the RO membranes.

Reverse Osmosis membrane arrangement: RO #1: GE RO #2: GE RO #3: GE

TABLE 4

Operating conditions for example 5

| Feed flow (l/s) | Recovery (%) | Inlet Temp (° C.) | pH | Anti-scalant | Dose (ppm) |
|---|---|---|---|---|---|
| 1.9 | 50% | 112 | 6 | PC-510T | 9.8 |

Results

Figure 6A:
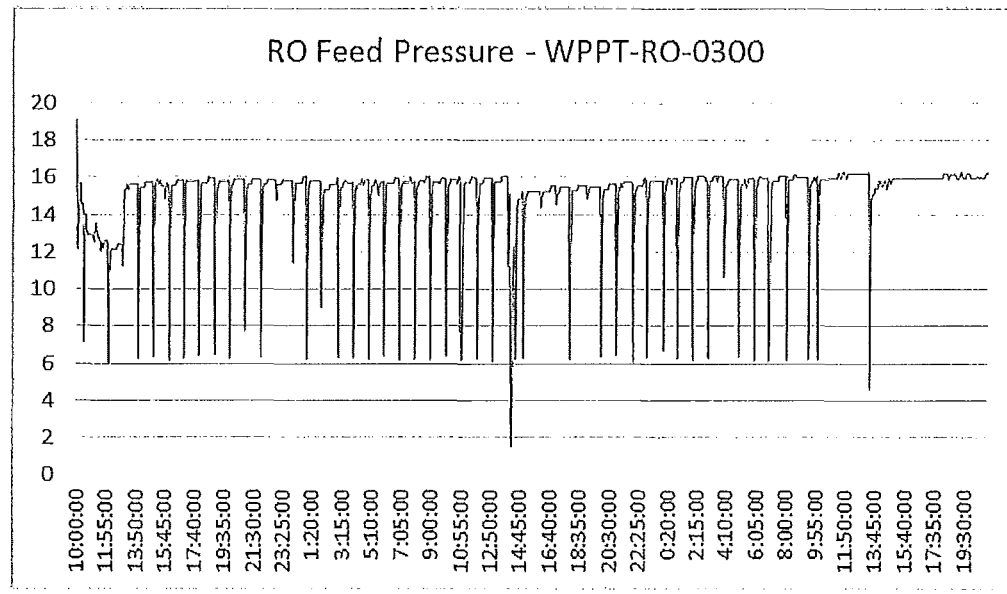
FIG. 6A shows the RO feed pressure for the trial described in example 5.

There was a gradual rise in RO feed pressure throughout the trial as seen in FIG. 6A. The RO feed pressure approached 16.3 bar after which the RO plant was shut down. The drop in RO feed pressure from ~16 bar down to ~5 bar every hour is a result of the fast forward flushes that were carried out during the trial.

TABLE 5 silica concentration at various stages

| Species | | CF | CC | CP | R |
|---|---|---|---|---|---|
| Silica (as $SiO_2$) | mg/L | 552 | 984 | 129 | 89.8% |

$C_P$ = concentration of species in permeate
$C_C$ = concentration of species in concentrate
$C_F$ = concentration of species in feed
R = rejection, expressed as a percentage Conclusions Over the 60 hour test period, a steady pressure rise was observed which indicated blocking of the membrane. Periodic reduction in pressure was found to alleviate pressure increase and facilitate throughput. It is believed that directing all RO feed flow to the RO concentrate stream increases the cross flow velocity and mechanically removes deposits from the membranes.

Fluid analysis indicated that a high proportion of silica is successfully retained and concentrated in the RO concentrate. From this run, it was concluded that the RO plant could operate at 50% RO recovery with a feed flow of 1.9 l/s with an RO feed pressure rise of 0.5 bar over a period of 60 hours (an increase of 0.05% per hour). This is a much longer period than previous trials which indicates that acidification of the fluid unexpectedly assisted with avoiding fouling of the membrane.

Figure 6B:
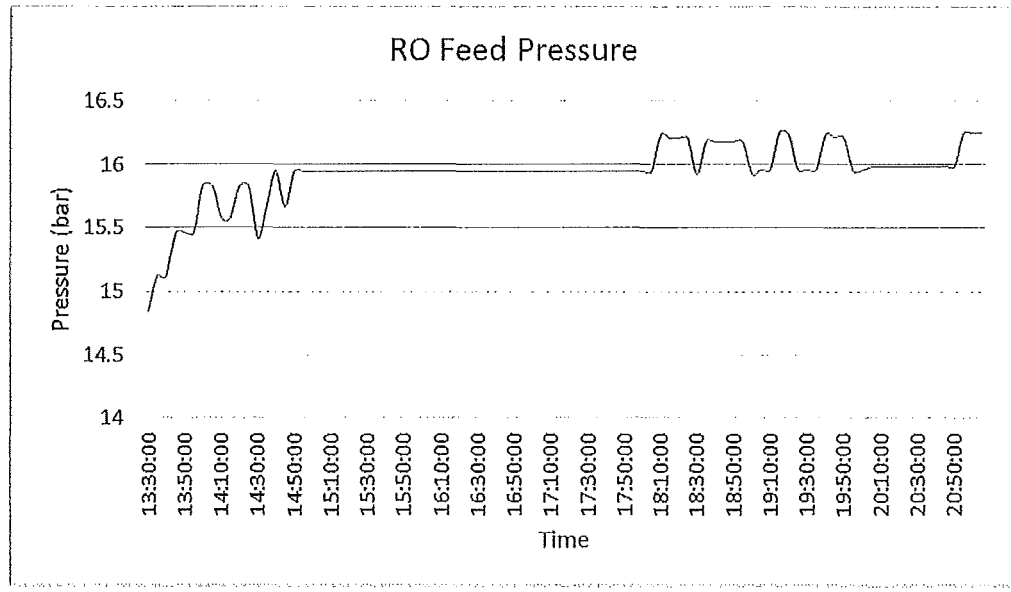
FIG. 6B shows the RO feed pressure for the trial described in example 5 where periodic reduction in pressure was discontinued.

FIG. 6B shows the RO feed pressure where periodic reduction in pressure was discontinued, it can be seen that the majority of the trial period resulted in a substantially constant feed pressure indicating that minimal blocking of the membrane occurred.

Example 6

To account for the relatively high level of calcium in the feed, this trial employed an anti-scalant to minimise fouling of the RO membranes.

Anti-scalant: Nalco Geo980 dosed at 10 ppm and Nalco Geo 905 dosed at 5 ppm

Reverse Osmosis membrane arrangement: RO #1: Nano RO #2: Nano RO #3: GE

Operating Conditions

TABLE 6

Operating conditions for example 6

| Feed flow (l/s) | Recovery (%) | Inlet Temp (° C.) | pH | Anti-scalant | Dose (ppm) | Dispersant | Dose (ppm) |
|---|---|---|---|---|---|---|---|
| 1.9 | 50% | 112 | 6 | Nalco Geo 980 | 9.8 | Nalco Geo 905 | 5 ppm |

The above operating conditions enabled stable throughput of geothermal fluid without periodic pressure reduction being required. Precipitated silica was successfully produced in the concentrate.

Example 7

The objective of this trial was to achieve steady conditions in the Reverse Osmosis (RO) Plant without encountering a significant pressure rise across the Reverse Osmosis membranes.

Operating Conditions

1. The system was pre-heated with RO permeate prior to introducing hot geothermal water into the system. For a complete breakdown of the pre-heat procedure see above.
2. Separated Geothermal Water (SGW) was sourced with a total silica concentration between 500-550 ppm and was ~126° C.
3. The hot geothermal water was cooled from 126° C. to 112° C. using a plate heat exchanger at the plant inlet.
4. From the heat exchanger the geothermal water was pumped through a 100 micron and a 10 micron cartridge filter in series to remove any particulate material before entering the RO units.
5. Hydrochloric acid was dosed downstream of the heat exchanger and mixed into the feed using the in-line static mixer. The Hydrochloric Acid decreased the pH from its native (8.4) to pH 6.
6. Antiscalant was added downstream of the acid dosing point and upstream of the pre-filters.
7. The SGW then passed through three vessels each containing two 8-inch RO membranes. The RO concentrate and RO permeate were cooled by plate heat exchangers individually to 60° C. and 50° C. respectively. Concentrate and permeate from the RO were fed to a concentrate holding tank and permeate tank to await further processing.

8. After exiting the RO, the concentrated silica underwent an induced improvement in its rate of polymerization in order to produce a silica product, whether this be colloidal or precipitated. Accordingly, RO concentrate was dosed with Sodium Hydroxide prior to entering a curing tank where the pH was increased to 8.5. The RO concentrate was retained in the curing tank for a period of 140-180 minutes, depending on RO feed flow, before being fed into a UF holding tank (SR1).

9. Concentrate from the RO was dosed with sodium hydroxide (to allow polymerisation of colloids) and fed to the first UF unit (UF1). The UF retentate (cross flow stream) was recycled back to the first UF holding tank (SR1) until the target concentration of silica colloids was achieved (5% w/w).

10. A proportion of the retentate was then bled off to a secondary UF holding tank (SR2) and the process repeated in a secondary ultrafiltration unit (UF2) to achieve a target 20% w/w colloid solution.

11. Permeate from the RO may was used to reduce the salt content of the concentrated silica solution (diafiltration) and hence reduce silica gel formation in the UF units. Diafiltration can be carried out on both UF stages.

12. The fluid stored in SRI was directed through an ultrafiltration unit (UF1). The primary ultrafiltration unit was made up of nine single PCI FP200 modules, each housing 18 tubular membranes. The primary ultrafiltration unit is operated by initially recycling all of the feed flow back into SR1. A proportion of the flow can be bled off to the second UF holding tank (SR2).

13. The three secondary ultrafiltration units are made up of single PCI FP200 tubular membranes and are twin entry flow type. Secondary UF plant is operated in a similar manner to UF1 by initially recycling all of the feed flow back into SR2. The filtrate from the ultrafiltration system is sent to waste.

14. Three fast forward flushes were carried out every hour to reduce the rate of the RO feed pressure rise. The objective of the fast forward flush was to direct all of the RO feed flow to the RO concentrate stream to increase the cross flow velocity across the membrane which would dislodge potential deposits mechanically.

Anti-scalant Dosing Settings: Nalco PC-510 ppm10, Nalco GEO905 10 ppm.

The Reverse Osmosis Recovery was set to 50% recovery. The RO feed flow rate varied between 1.3 and 1.7.

Results

Figure 7:
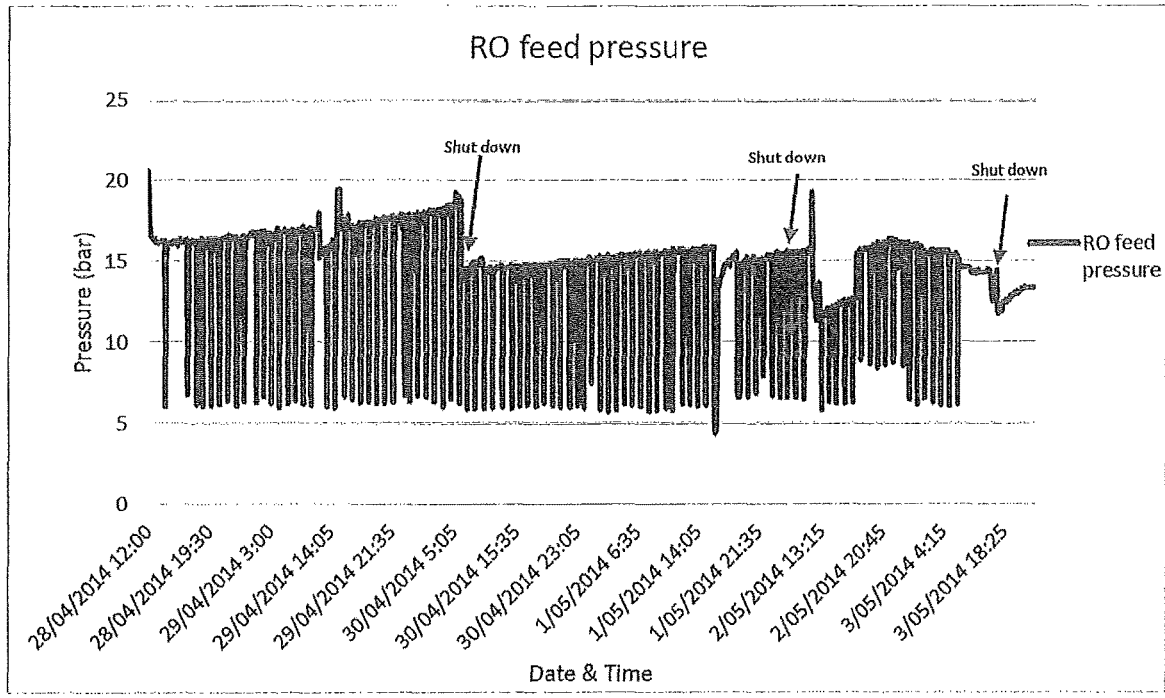
FIG. 7 shows the RO feed pressure for the trial described in example 7

FIG. 7 shows the RO feed pressure during the course of the trial. The RO plant was shut down three times during this trial to carry out chemical cleans and recover the RO membranes.

TABLE 7

| Average monomeric silica concentration (mg/L) | | |
| --- | --- | --- |
| RO-concentrate | UF1-feed | UF1-filtrate |
| 950 | 760 | 210 |

Monomeric silica values of the UF feed throughout this run were measured to be $[SiO_2]_{mono}$=740-780 ppm.

Monomeric silica values of the UF filtrate throughout this run were measured to be 200-220 ppm.

Monomeric silica values of the RO-concentrate throughout this run were measured to be 920-960 ppm.

Silica scaling is not wanted in or prior to the RO system as it will foul the membranes. It has been found that this rate of fouling can be reduced at a lower pH. A pH range of 4.0-5.5 is believed best to minimise this rate of fouling.

After exiting the RO, the inventors increased the pH of the concentrate to 8.5. Despite increasing the silica saturation level, the increased hydroxide present is believed to have catalysed the polymerisation of monomeric silica thus inducing the production of colloidal silica.

Conclusions

The acid dosing and anti scalant dosing resulted in effective throughput. The RO system produced silica concentrate over long periods of substantially continuous operation with only 0.30% and 0.02% increase in pressure per hour for respective trials (each trial being defined as the period between startup and until shutdown and cleaning was carried out).

Example 8

The primary objective of this trial was to carry out optimization tests using both the Reverse Osmosis (RO) and Ultrafiltration (UF) processes.

RO Operating Conditions

1. The pilot plant was pre-heated with RO permeate prior to introducing hot geothermal water into the system. For a complete breakdown of the pre-heat procedure see above.

2. Separated Geothermal Water (SGW) was sourced with a total silica concentration between 500-550 ppm and was ~126° C.

3. Two antiscalant dose points were added to the plant inlet upstream of the plant inlet heat exchanger.

4. Antiscalant dose rates for GEO980 and GEO905 remained constant for all runs at 10 ppm and 5 ppm respectively. The GEO980 was used as a silica inhibitor while GEO905 used for calcite. After both antiscalants (GEO980 and GEO905) were dosed into the SGW, the hot geothermal water was cooled from 126° C. to 112° C. using a plate heat exchanger at the plant inlet.

5. From the heat exchanger the geothermal water was pumped through a 10 micron cartridge filter to remove any particulate material before entering the RO units.

6. Hydrochloric acid was dosed downstream of the heat exchanger and mixed into the feed using an in-line static mixer. The Hydrochloric Acid decreased the pH from its native (8.4) to pH 5.5.

7. The SGW then passed through three vessels each containing two 8-inch Filmtech RO membranes (Membrane Development Specialists, San Diego). The RO concentrate and RO permeate were cooled by plate heat exchangers individually to 70° C. and 60° C. respectively. Concentrate and permeate from the RO were fed to a concentrate holding tank and permeate tank to await further processing.

8. RO concentrate was dosed with Sodium Hydroxide prior to entering a curing tank, and the pH was increased to 8.5. The RO concentrate cured in the curing tank for a period of 75 minutes prior to being fed into a first UF holding tank (SR1).

The RO units were fed at a flow rate of 1.9 L/s for the duration of the trial. The Reverse Osmosis Recovery was set to 40% recovery.

Ultrafiltration Operating Conditions
1. The RO concentrate stored in SR1 was fed to a first ultrafiltration unit (UF1) where the cross flow stream was recycled back into SR1 until the target concentration of silica colloids was achieved (6 wt % colloidal solution). At this point a proportion of the cross flow was bled off into a second UF holding tank (SR2) and the process repeated in a second ultrafiltration unit (UF2) to achieve a target 30 m % colloid solution.
2. The nine primary ultrafiltration units are made up of single PCI FP200 tubular membranes. The three secondary ultrafiltration units are made up of single PCI FP200 tubular membranes and are twin entry flow type. The secondary UF unit (UF2) was operated in a similar manner to UF1 by initially recycling all of the feed flow back into SR2.
3. Permeate from the RO was used to reduce the salt content of the concentrated silica solution in SR1 by diafiltration and hence minimise silica gel formation in the UF unit. Sodium hydroxide was added to maintain a pH of 10 when the colloidal silica exceeded 10 m % to prevent silica gel formation.
4. Primary Ultrafiltration (UF1)-The Primary Ultrafiltration system consisted of 9 PCI modules in series. The RO Concentrate that is stored in the first UF holding tank (SR1) is pumped through all nine Primary Ultrafiltration Modules. Two streams are created in the process: UF retentate and UF filtrate. The UF retentate is sent back into SR1 ready to be concentrated further, while the UF filtrate is directed to waste.
5. Secondary Ultrafiltration (UF2)-a second UF unit received the UF1 concentrate at 6 m % and concentrated it further to approximately 20 m %. The retentate was tested using TEM imaging, surface area titration and total silica analysis.

Results

Figure 8:
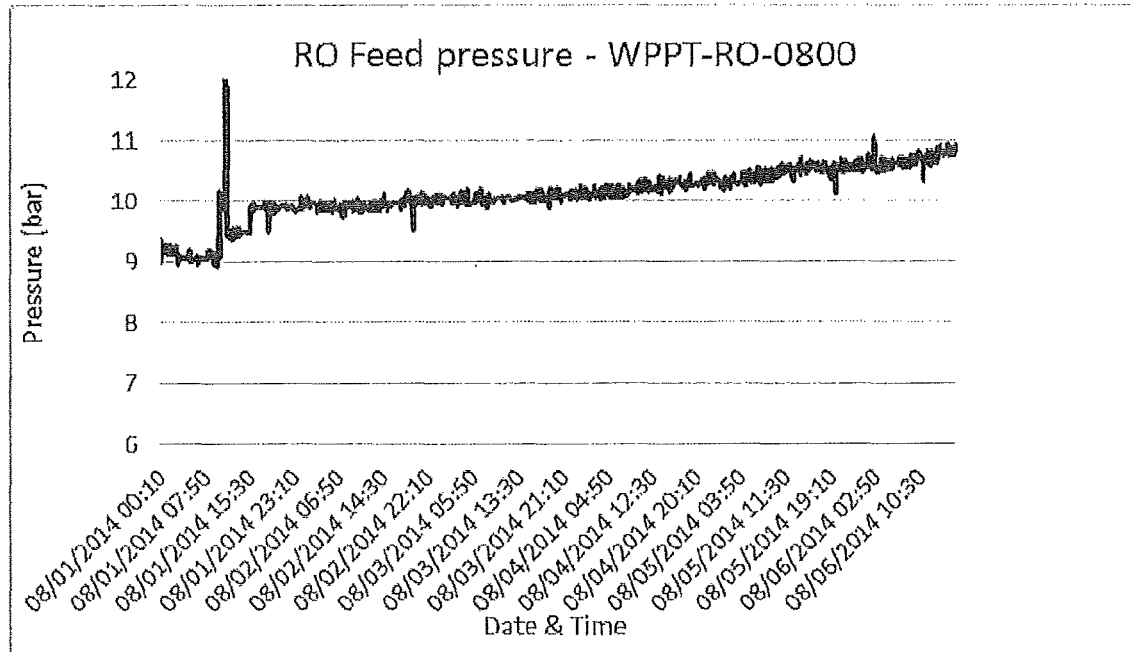
FIG. 8 shows the RO feed pressure for the trial described in example 8

FIG. 8 shows the feed pressure over the course of the trial. At the end of the trial, the feed pressure approached 10.8 bar, therefore increasing by approximately 1 bar from the start to the end of the trial. The pressures in the RO feed increased slightly during this trial. The increase in pressure was approximately 0.07% per hour over the duration of the trial.

TABLE 8

| Silica concentration for example 8 | | | |
|---|---|---|---|
| Sample description | RO feed | RO concentrate | RO permeate |
| Silica 40% recovery | 530 ppm | 850 ppm | 51 ppm |

UF2 retentate returned the following analysis values:
Conductivity=4.31 mS/cm
pH=9.68
density=1.124 g/cm$^3$
This indicates that a volume of 19.79 m % silica was produced.

Figure 9A:
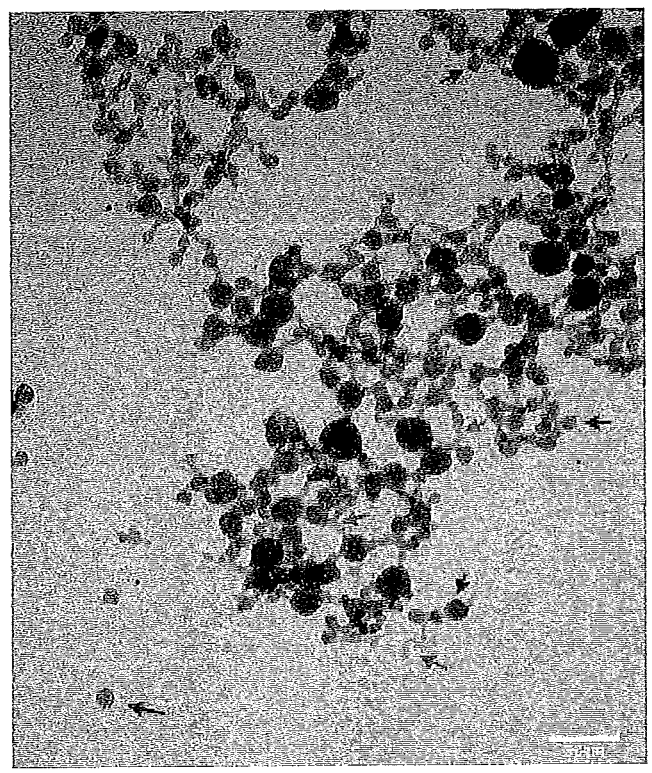
FIGS. 9A and 9B show transmission electron microscope (TEM) images of silica colloids produced according to the method described in example 8.
Figure 9B:
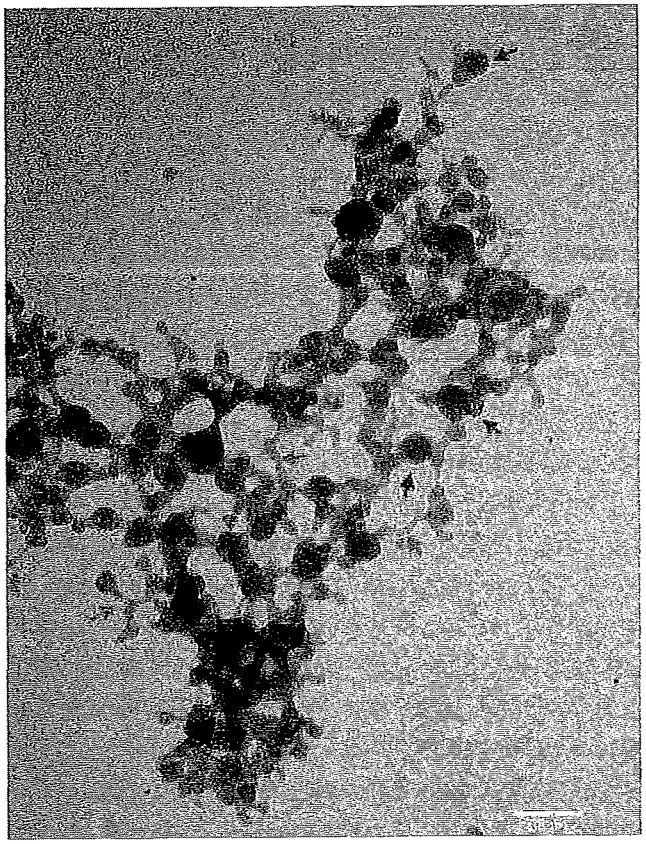

TEM imaging: FIGS. 9A and 9B show TEM images taken after a 1:100 dilution with water. Red arrows indicate colloids. Green arrows indicate filamentous joinings.

Surface Area Titration involves titrating a known mass of silica with hydroxide and using this titer to determine the amount of hydroxide adsorbed onto the silica surface, from this the surface area can be deduced. This method yielded a surface area of 430.32 m$^2$/g. Using geometrical derivations this result was converted into an average particle diameter of 6.34 nm.

Conclusion

This trial demonstrated the successful production of a silica concentrate using RO with acidified geothermal fluid. Colloidal silica at approximately 20 m % was also produced following ultrafilitration of the silica concentrate. To produce precipitated silica, a precipitant may be added to the colloidal silica concentrate.

Example 9

Figure 10:
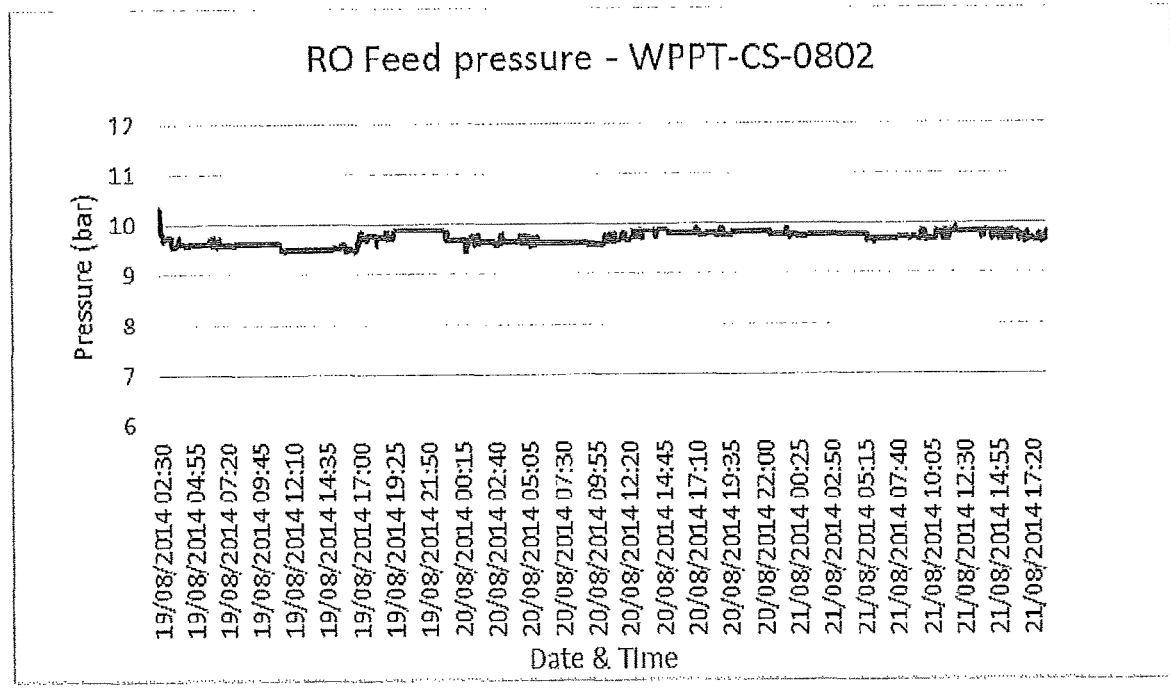
FIG. 10 shows the RO feed pressure for the trial described in example 9.

The trial carried out in example 8 was repeated using the same RO operating conditions but using new membranes. FIG. 10 shows that although there were some minor fluctuations, a steady feed pressure was achieved over the 63 hour test period indicating minimal or zero fouling of the RO membrane.

Example 10

Figure 11:
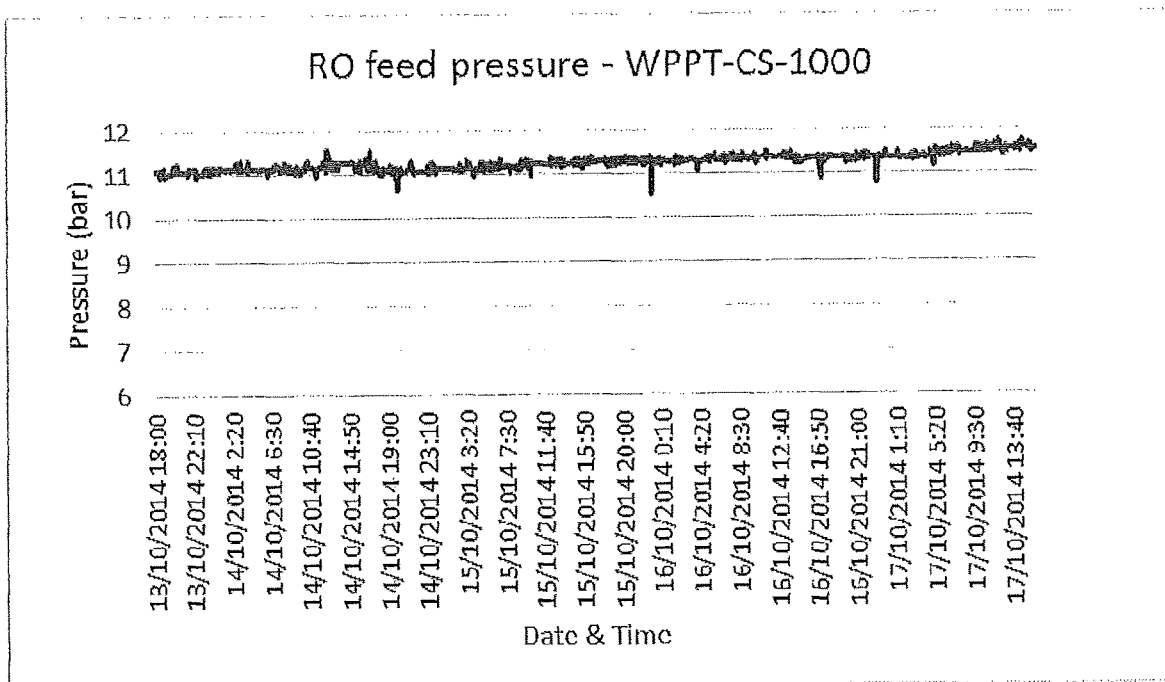
FIG. 11 shows the RO feed pressure for the trial described in example 10.

The trial carried out in example 9 was repeated using the same RO operating conditions. FIG. 11 shows that a steady feed pressure was achieved indicating minimal or zero fouling of the RO membrane. The overall increase in feed pressure over the 94 hour test period was 0.3 bar. This indicates a rise of approximately 0.0032 bar per hour or 0.00031% increase per hour.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the scope of the invention.

The invention claimed is:
1. A method of producing a silica concentrate from a geothermal fluid containing silica, the method comprising:
   a. reducing the pH of the geothermal fluid to between about 4.0 and 7.5 prior to passing the geothermal fluid to a reverse osmosis (RO) unit; and b. passing the geothermal fluid of a, at a temperature of at least 85° C. to the RO unit to produce a silica concentrate and a permeate;
wherein the silica concentration in the geothermal fluid is at least 300 ppm,
wherein the silica concentrate is processed to produce at least one of precipitated silica and colloidal silica,
wherein the processing comprises further concentrating the silica in the silica concentrate by ultrafiltration (UF), and
wherein the method includes a step of pre-heating the reverse osmosis unit to a temperature of between about 70° C. and about 200° C. prior to passing the geothermal fluid through the RO unit.

2. A method as claimed in claim 1 wherein the pH is reduced by addition of at least one acid to the geothermal fluid.

3. A method as claimed in claim 1 wherein the method includes a further step to improve flow of the geothermal fluid through the RO unit comprising the addition of an anti-scalant to the geothermal fluid prior to passing the geothermal fluid to the reverse osmosis unit.

4. A method as claimed in claim 1 wherein between 30% and 70% of the geothermal fluid passes through the RO unit as the permeate.

5. A method as claimed in claim 1 wherein a feed pressure of the geothermal fluid at the RO unit is substantially constant relative to an amount of the geothermal fluid passing through the RO unit as the permeate during substantially continuous operation of the method.

6. A method as claimed in claim 5 wherein the feed pressure of the geothermal fluid increases by less than 5% relative to the amount of the geothermal fluid passing through the RO unit as the permeate over a representative period of one hour of substantially continuous operation of the process.

7. A method as claimed in claim 1 wherein the method includes a step of pre-heating the RO unit to a temperature substantially equal to the temperature of the fluid passed to the reverse osmosis unit.

8. A method as claimed in claim 1 wherein the RO unit is pre-heated by a pre-heating stream heated by geothermal fluid at a temperature sufficient to transfer heat to the pre-heating stream.

9. A method as claimed in claim 8 wherein the pre-heating stream comprises permeate previously collected from the RO unit.

10. A method as claimed in claim 1 wherein the silica concentrate is treated by a UF pre-treatment to increase silica particle polymerization wherein the UF pre-treatment comprises increasing the pH of the silica concentrate from the reduced pH value to between pH 7.0 and 10.0 prior to ultrafiltration.

11. A method as claimed in claim 10 wherein the UF pre-treatment further comprises curing the silica concentrate for at least 5 minutes to produce a cured silica concentrate.

12. A method as claimed in claim 1 wherein the silica concentrate following the ultrafiltration is at a silica concentration of between about 0.1 m % and 20 m %.

13. A method as claimed in claim 12 wherein the silica concentrate following the ultrafiltration is further concentrated by a second or further ultrafiltration.

14. A method as claimed in claim 1 wherein the silica concentrate is further processed to produce colloidal silica.

15. A method as claimed in claim 1 wherein the further processing produces colloidal silica and the further processing comprises at least one of the following steps:
  a. passing the silica concentrate to a curing tank to produce a cured silica concentrate,
  b. diafiltrating the silica concentrate with RO permeate to reduce salt concentration, and
  c. passing the silica concentrate further concentrated in silica through a further RO unit to increase silica recovery.

* * * * *